(12) United States Patent
Girard et al.

(10) Patent No.: US 6,702,977 B2
(45) Date of Patent: Mar. 9, 2004

(54) EXPANDABLE BEAD MOLDING RING FOR A TIRE MOLD

(75) Inventors: Jean-Claude Girard, Copley, OH (US); Brett Alan Kasper, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 202 days.

(21) Appl. No.: 10/058,892

(22) Filed: Jan. 28, 2002

(65) Prior Publication Data

US 2003/0141629 A1 Jul. 31, 2003

(51) Int. Cl.[7] .............................................. B29C 35/02
(52) U.S. Cl. ......................... 264/326; 264/315; 425/36
(58) Field of Search ........................... 425/36; 264/315, 264/326, 501

(56) References Cited

U.S. PATENT DOCUMENTS

| | | | |
|---|---|---|---|
| 1,989,363 A | * | 1/1935 | Iverson .......................... 425/36 |
| 2,904,832 A | * | 9/1959 | Frohlich et al. ............... 425/36 |
| 4,154,790 A | * | 5/1979 | Allitt ............................. 425/36 |
| 4,236,883 A | | 12/1980 | Turk et al. |
| 5,129,802 A | | 7/1992 | Sergel et al. |
| 5,749,980 A | | 5/1998 | Izuchi et al. |
| 5,787,950 A | | 8/1998 | Muhlhoff et al. |
| 6,092,575 A | | 7/2000 | Drieux et al. |
| 6,238,193 B1 | | 5/2001 | Bosseaux |

OTHER PUBLICATIONS

Co–pending U.S. patent application Docket No. DN2002014USA filed on even date herewith entitled Radially Expandable Bead Molding Ring for a Tire Mold Inventors: Girard et al.

* cited by examiner

Primary Examiner—James P. Mackey
(74) Attorney, Agent, or Firm—Howard M. Cohn

(57) ABSTRACT

Apparatus and method for molding a tire (110) with an expandable bead molding ring assembly (250) having a two-stage movement from a retracted and disengaged state, to a radially expanded state, to an expanded and engaged state for molding a tire bead (112*b*). The two-stage movement is accomplished using a simple assembly of easily manufactured parts, and is driven by a simple continuous downward (axially outward) movement (320) of a hub (209) of a mold press (220). A combination of annular elements with springs converts the hub movement to the desired two-stage movement of segments (254, 256) of a segmented bead molding ring (252). Frustraconical cam surfaces (258, 266) are used to divide axially directed forces (420*a*, 420*b*) from the mold press movement (320) into radial force components (410*a*, 410*b*) and axial force components (415*a*, 415*b*) for causing corresponding radial movements (310) and axial movements (315) during the two stage movement. Spring resistances are balanced, and stopping surfaces are provided in order to control and properly sequence the two-stage movement. The elements of the expandable bead molding ring assembly are preferably assembled with a sidewall mold to form a single unit (280) that is easily maintained and easily switched in and out of the mold press for mold changeover to adapt to different profiles to be molded on beads of different tire constructions.

20 Claims, 15 Drawing Sheets

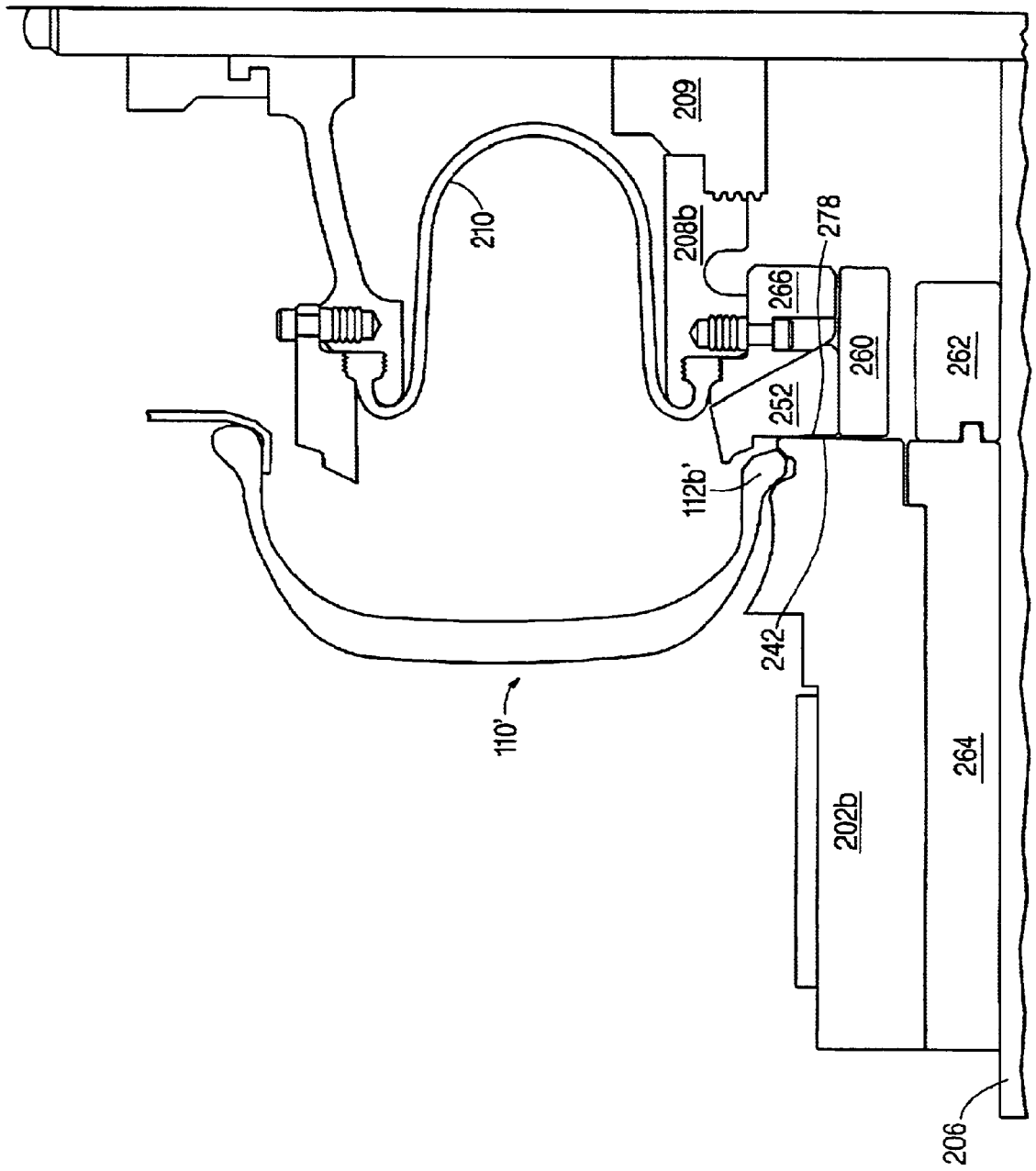

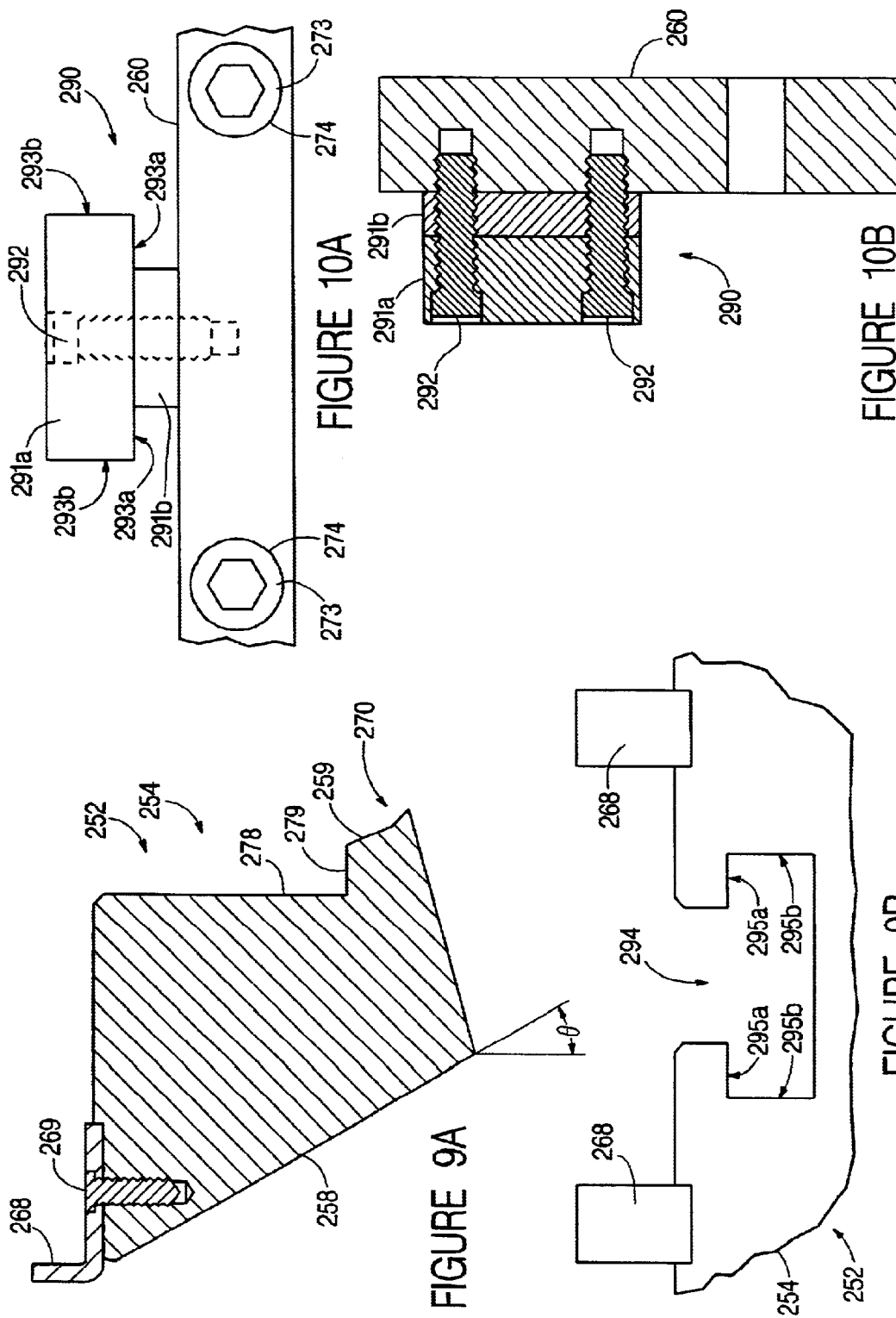

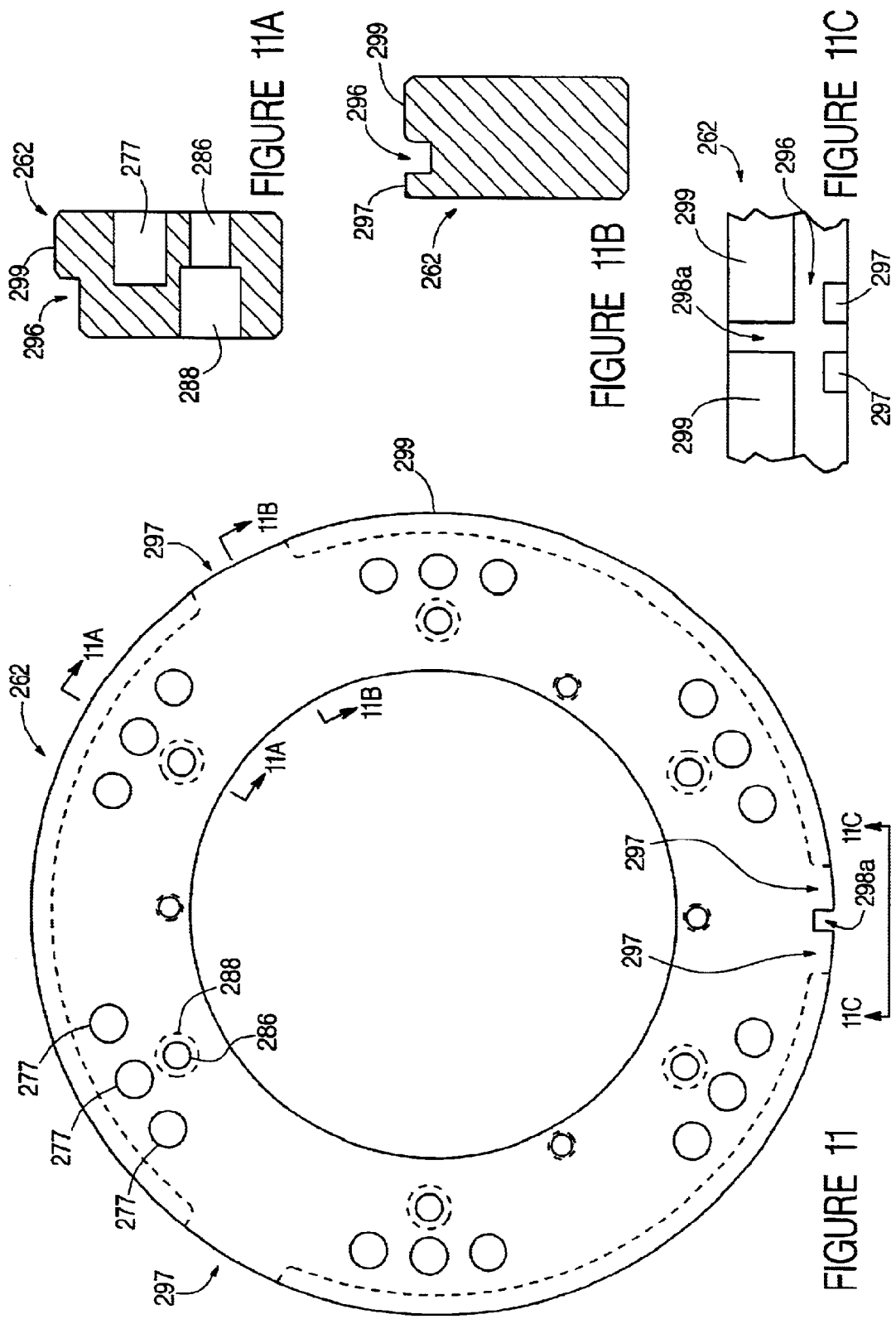

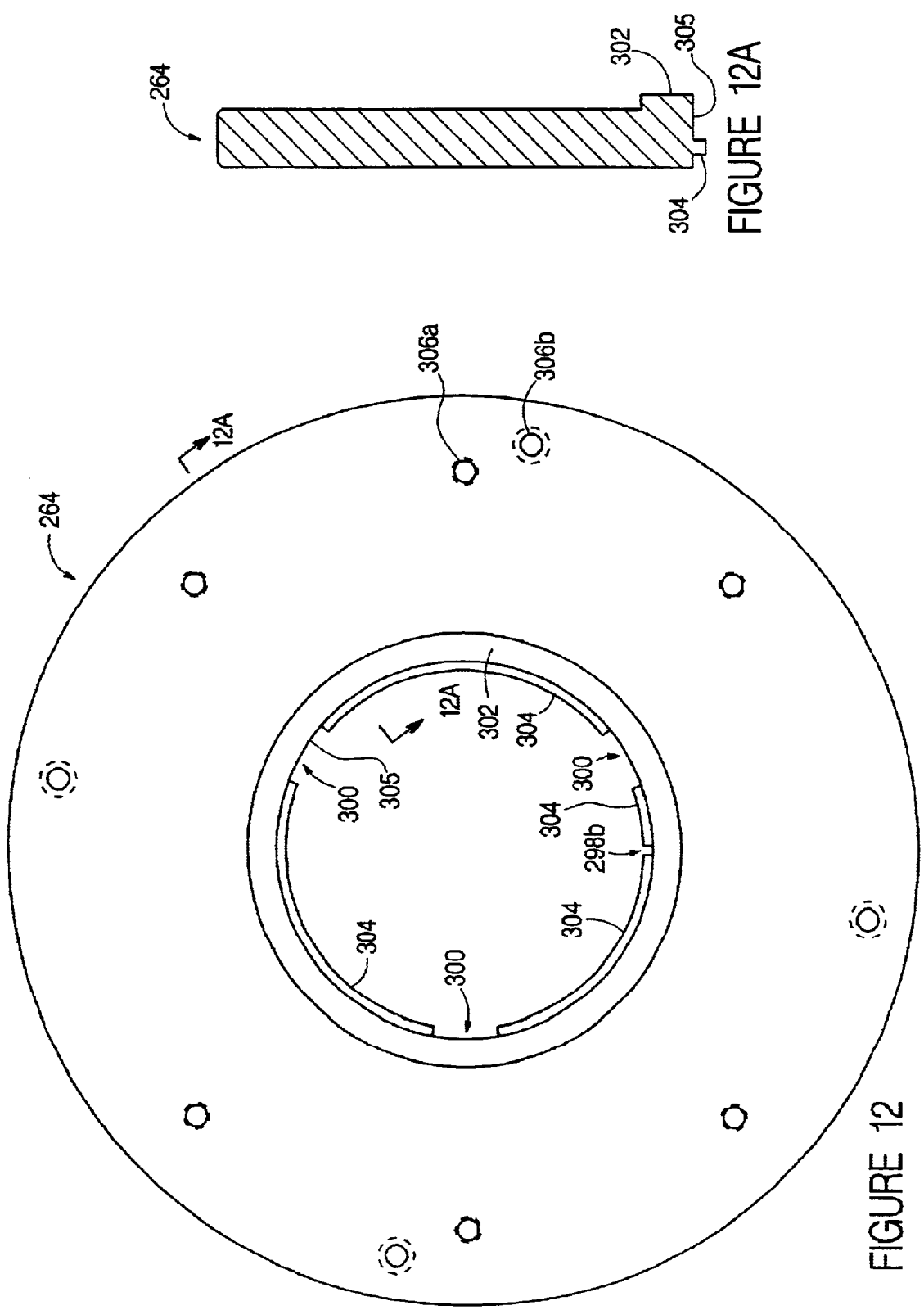

EXPANDABLE BEAD MOLDING RING FOR A TIRE MOLD

CROSS-REFERENCE TO RELATED APPLICATIONS

This application relates to copending U.S. application Ser. No. 10/058,538 entitled RADIALLY EXPANDABLE BEAD MOLDING RING FOR A TIRE MOLD, having a filing date concurrent with that of the present invention.

TECHNICAL FIELD OF THE INVENTION

The present invention relates to the molding of tires. In particular, it pertains to methods and apparatus for molding a tire bead using a radially expandable bead molding ring.

BACKGROUND OF THE INVENTION

Reference is made herein to an "undercut" bead, referring to the shape of the bead base (the radially inner surface of a tire bead that seats in the bead seat portion of a wheel rim). Tire bead bases are most commonly substantially flat and are angled from zero to several degrees relative to the axial direction with the bead base angle opening axially outward. An undercut bead base may be similarly shaped except that the bead base angle opens axially inward. Examples of tires with undercut bead bases, and examples of wheel rims using such tires, are seen in U.S. Pat. No. 6,092,575. In particular, it should be noted that a common variant of a tire with the undercut bead base design comprises beads of two different diameters on the same tire.

In order to mold certain tire constructions, such as those having undercut beads, it becomes necessary to introduce a portion of the tire mold known as the bead molding ring or counter-molding ring into the interior of the tire in order to engage a molding surface against the bead base. In the prior art, means are known for accomplishing the molding of an undercut portion of a tire bead. For example, U.S. Pat. No. 5,129,802 proposes using two counter-molding rings (bead molding rings) for the axially and radially inner portion of the bead, said rings being continuous. In order to introduce the counter-molding rings into the interior of the tire, it is necessary to deform the raw blank of the tire by ovalizing at least one of the beads, so that the bead can be made to pass beyond the counter-molding ring or rings.

Rings for molding the radially and axially inner portion of a bead have also been described in connection with so-called membrane-less vulcanizing presses. See, for example, U.S. Pat. No. 4,236,883 (referred to hereinafter as the '883 patent), which discloses such rings, in this instance made in several segments circumferentially adjacent in molding position. These rings are radially retractable so that they can be introduced into the tire interior without requiring deformation of the tire beads. The '883 patent describes a mechanism occupying integrally the inner volume of the press, so that the necessary movements can be imparted to the several ring segments in order for said segments to accommodate a closing or opening movement in sequence. By a "movement in sequence" is meant that, from a configuration in which the mold is open, the segments do not all go to their molding position at the same time. A first group is brought to its final molding position, then the segments of a second group are inserted between segments of the first group to make a continuous ring. As seen in the '883 patent's FIGS. 1–2, the first and second segments join along axially aligned planar surfaces, and all segments rotate into position by means of bellcranks (66) rotating on pivots (70) in depending clevis' (74). The bellcranks have cam followers that coact with a multi-faceted linear cam assembly (102) for controlled actuation of the segments mounted on the bellcranks.

U.S. Pat. No. 6,238,193 (referred to hereinafter as the '193 patent) discloses a mold for a tire and a vulcanizing press fitted to receive said mold: a mold for molding a tire having beads of different diameters, $\Phi 0$ being the minimum diameter of the tire area at the bead of smaller diameter, $\Phi 2$ being the minimum diameter of the tire area at the bead of greater diameter. The mold has two sidewall plates for molding, respectively, the outer surface of the sidewalls and the outer portion of each bead up to a radially inner limit where the diameter of the tire area is $\Phi 0$ and $\Phi 2$, respectively, a continuous counter-molding ring to mold the bead of smaller diameter from the said radially inner limit where the diameter of the tire area is $\Phi 0$ to an axially inner limit of diameter $\Phi 1$, where $\Phi 1$ is smaller than $\Phi 2$, and a split counter-molding ring to mold the bead of greater diameter from the said radially inner limit where the diameter of the tire area is $\Phi 2$ to an axially inner limit of diameter $\Phi 3$. As seen in the '193 patent's FIG. 1, the tire bead bases are undercut, i.e., $\Phi 1$ is greater than $\Phi 0$, and $\Phi 3$ is greater than $\Phi 2$. The split ring includes a plurality of retractable segments adjacent in molding position. A flexible membrane molds the inner surface of the tire in the portion of the inner cavity of the tire between the limit of diameter $\Phi 1$ and the limit of diameter $\Phi 3$.

As viewed in its FIGS. 2–11, the '193 patent discloses a complex mechanism for engaging the split counter-molding ring to mold the lower bead (the bead with the greater diameter). The split counter-molding ring is annular and comprises large segments (141) with beveled edges and smaller key segments (142) having corresponding beveled edges. The edges are beveled at an angle to the axial direction (see FIG. 4), so that the key segments can be fitted into the annular ring by moving axially down in between the large segments. After the segments have been fitted together (FIGS. 8–10), the ring is pressed down axially against the lower mold sidewall plate 12 to form the bead area (FIG. 11). A problem with the split counter-molding ring design is a complex set of linkages and mechanisms attached to the mold press that is difficult and expensive to manufacture, and that also makes maintaining and changing the vulcanizing mold in the press a time-consuming and difficult process. As viewed in the '193 patent's FIG. 2, the split counter-molding ring (14) comprises first segments (141) each mounted on a rocking arm (52), itself mounted rotatably on the slide (17) that is mounted on the lower frame 22 of the press. A roller (521) mounted on each of the rocking arms acts against a first cam 42 that is integral with the lower membrane plate (32). The second (key) segments (142) are mounted on a guide plate (321) in grooves (53) formed between said guide plate (321) and the first cam (42). A roller (531) is rotatably mounted on each of the second segments and rides against a second cam (43) fixed on the lower frame (22) of the press. The profile of the radially outer surface of said second cam (43) serves to impart a controlled motion for the advance of each of the second segments (142).

It is an object of the present invention to overcome the problems and limitations of the prior art tire molds, particularly molds using radially expandable bead molding rings, such as for molding undercut beads. Problems to be solved include reduction of mechanical complexity to simplify manufacturing of the molds, and to ease mold/press maintenance and changeover.

BRIEF SUMMARY OF THE INVENTION

According to the invention, a method is disclosed for providing a two-stage movement for engagement of an expandable bead molding ring with a sidewall molding plate to form a bead molding pocket in a tire mold within a mold press; wherein a first stage of movement comprises radial expansion of the bead molding ring to form a circumferentially continuous outward-facing bead molding surface that is positioned axially inward of the sidewall molding plate; and a second stage of movement comprises pressing the bead molding ring axially outward to engage the bead molding surface with the sidewall molding plate, thereby forming a bead molding pocket for molding a green tire bead; the method comprising the steps of: using axial movement of the mold press to cause both the first stage and the second stage of movement; resisting the first stage of movement with a first set of springs; providing first stopping surfaces for halting the first stage of movement when the circumferentially continuous outward-facing bead molding surface is formed; resisting the second stage of movement with a second set of springs; providing the second set of springs with spring resistance sufficient to prevent axial movement of the bead molding ring until after the first stage of movement is halted by the first stopping surfaces; and providing second stopping surfaces for halting the second stage of movement when the bead molding pocket has been formed.

According to the invention, the method further comprises the step of providing a cam surface on the bead molding ring for dividing an axial force from the mold press into radial force components and axial force components for causing corresponding radial movements and axial movements of the bead molding ring.

According to the invention, the method further comprises the steps of: using the second set of springs to cause axial disengagement of the bead molding surface from the sidewall molding plate when axial movement of the mold press removes force from the second set of springs; and using the first set of springs to cause radial retraction of the bead molding ring when axial movement of the mold press removes force from the first set of springs.

According to the invention, an expandable bead molding ring assembly is disclosed for a tire mold in a mold press that is configured to mold a green tire comprising a tread, two beads, and two sidewalls extending between the beads and the tread; the expandable bead molding ring assembly characterized by: a first annulus that is a segmented bead molding ring, comprising a plurality of segments that radially expand to form a circumferentially continuous radially outward-facing surface for molding one of the beads, and a radially inner frustraconical cam surface for dividing axially-directed forces into a radial force component and an axial force component; a second annulus, concentric and axially adjacent to the first annulus, that is a top spring plate, comprising radially-oriented radial springs that are attached to all of the plurality of segments for controlling radial movement of the plurality of segments; and a third annulus, concentric and axially adjacent to the second annulus, that is a bottom spring plate, comprising axially-oriented axial springs acting between the second annulus and the third annulus for controlling axial movement of the plurality of segments.

According to the invention, the expandable bead molding ring assembly is further characterized by a fourth annulus having a frustraconical radially outer cam surface that is complementary to the radially inner cam surface of the first annulus, wherein: the fourth annulus is attached to the mold press such that the mold press will impart axially directed movement and axially directed forces to the fourth annulus; and the radially outer cam surface of the fourth annulus is positioned concentrically within the first annulus such that the radially outer cam surface of the fourth annulus bears on the radially inner cam surface of the first annulus for applying the axially directed forces from the mold press to the cam surface of the first annulus.

According to the invention, the expandable bead molding ring assembly is further characterized by: a plurality of tee-shaped guide slots in the first annulus opening toward the adjacent second annulus, wherein a wider crossbar portion of the tee-shape has radially aligned slot guide surfaces; and a plurality of guide tees protruding from the second annulus toward the adjacent first annulus, shaped and dimensioned to fit inside the tee-shaped guide slots, the guide tees comprising a crossbar having tee guide surfaces complementary to the slot guide surfaces for holding the segments of the first annulus at a fixed axial distance from the second annulus while also allowing the segments to slide radially in and out.

According to the invention, the expandable bead molding ring assembly is further characterized by: a plurality of guide bolts that slidingly pass through axially-aligned guide holes in the third annulus and are attached to the second annulus, for holding the second and third annuluses concentric and axially adjacent while guiding movement of the second annulus in an axial-only direction. Preferably there is also a bolt head on each guide bolt; and a cavity that widens each guide hole in the third annulus, such that the bolt head has clearance to move axially within the cavity but limits the axially inward movement of the second annulus that is attached to the guide bolt, when the bolt head stops against the end of the cavity.

According to the invention, the expandable bead molding ring assembly is further characterized by: a plurality of spring hooks attached to the segments of the first annulus such that each spring hook extends to one of the radial springs of the second annulus for interaction whereby the radial springs exert radially-directed force on the segments. Preferably, the radial springs of the second annulus are held in radially-aligned spring holding holes that have hook slots for providing an opening along a side of each spring holding hole such that a spring hook hooks through the hook slot into the spring holding hole to interact with the radial spring; and the radial springs exert a radially-inward directed force on the segments of the first annulus. Further preferably, at least one spring hook is used to limit the extent of radial movement of the segments of the first annulus when the spring hook stops against an end of the hook slot.

According to the invention, the expandable bead molding ring assembly is further characterized in that: each axially-oriented axial spring has one end seated in a first axial spring pocket in the second annulus, and has an other end seated in a second axial spring pocket in the third annulus, such that the axial springs exert a separating force between the second annulus and the third annulus.

According to the invention, the expandable bead molding ring assembly is further characterized in that: half of the plurality of segments of the first annulus are first segments that are complementary to, and circumferentially alternated with second segments; the first segments are wedge shaped, having circumferentially lateral faces that converge towards a radially outward-facing bead molding surface of the bead molding ring, the first segment lateral faces being planar and oriented in an axial direction; and the second segments have lateral faces that are complementary to the first segment lateral faces.

According to the invention, the expandable bead molding ring assembly is further characterized in that: the first annulus, second annulus, and third annulus are concentric to, and radially within an annular sidewall molding plate; a fifth annulus that is an adapter plate is concentric, adjacent, and axially outward of the sidewall molding plate; and the third annulus is attached to the fifth annulus such that a tongue protruding from a radially inner periphery of the fifth annulus is trapped in a groove between flanges and a radially outer periphery of the third annulus.

According to the invention, a mold is disclosed for a green tire comprising a tread, two beads each having a radially inward-facing bead base extending from an axially outer heel to an axially inner toe, and two sidewalls extending between the beads and the tread; the mold comprising: first and second sidewall plates for molding, respectively, an outer surface of each of the sidewalls plus an axially outer portion of each of the beads approximately in to the heel; first and second bead molding rings for molding at least the bead bases of the two beads; and an inflatable vulcanizing membrane for molding the inside surfaces of the tire; wherein the mold is characterized by: at least one segmented bead molding ring that is annular and comprises a plurality of segments that radially expand to form a circumferentially continuous radially outward-facing surface for molding one of the beads in cooperation with one of the sidewall plates and the vulcanizing membrane; and a radially inner frustra-conical cam surface for dividing axially-directed forces into a radial force component and an axial force component; an annular top spring plate, concentric and axially adjacent to the segmented bead molding ring, comprising radially-oriented radial springs that are attached to all of the plurality of segments for controlling radial movement of the plurality of segments; an annular bottom spring plate, concentric and axially adjacent to the top spring plate, comprising axially-oriented axial springs acting between the top spring plate and the bottom spring plate for controlling axial movement of the plurality of segments; and an annular lock ring having a frustraconical radially outer cam surface that is complementary to the radially inner cam surface of the first annulus, wherein: the lock ring is attached to the mold press such that the mold press will impart axially directed movement and axially directed forces to the lock ring; and the radially outer cam surface of the lock ring is positioned concentrically radially within the segmented bead molding ring such that the radially outer cam surface of the lock ring bears on the radially inner cam surface of the segmented bead molding ring for applying the axially directed forces from the mold press to the cam surface of the segmented bead molding ring.

According to the invention, the mold is further characterized by: a plurality of tee-shaped guide slots in the segmented bead molding ring opening toward the adjacent top spring plate, wherein a wider crossbar portion of the tee-shape has radially aligned slot guide surfaces; and a plurality of guide tees protruding from the top spring plate toward the adjacent segmented bead molding ring, shaped and dimensioned to fit inside the tee-shaped guide slots, the guide tees comprising a crossbar having tee guide surfaces complementary to the slot guide surfaces for holding the segments of the segmented bead molding ring at a fixed axial distance from the top spring plate while also allowing the segments to slide radially in and out.

According to the invention, the mold is further characterized by: a plurality of guide bolts that slidingly pass through axially-aligned guide holes in the bottom spring plate and are attached to the top spring plate, for holding the top spring plate and the bottom spring plate concentric and axially adjacent while guiding movement of the top spring plate in an axial-only direction.

According to the invention, the mold is further characterized by: a two-stage movement for engagement of the segmented bead molding ring with the tire bead, wherein a first stage of movement comprises radial expansion of the segmented bead molding ring to form the circumferentially continuous outward-facing bead molding surface that is positioned axially inward of the tire bead; and a second stage of movement comprises pressing the segmented bead molding ring axially outward to engage the bead molding surface with the green tire bead and to work with one of the sidewall plates to form a bead molding pocket; first stopping surfaces for halting the first stage of movement when the circumferentially continuous outward-facing bead molding surface is formed; spring resistance in the axial springs sufficient to prevent axial movement of the bead molding ring until after the first stage of movement is halted by the first stopping surfaces; and second stopping surfaces for halting the second stage of movement when the bead molding pocket has been formed.

According to the invention, the mold is further characterized by a mold assembly for switching in and out of the mold press as a single unit comprising: the segmented bead molding ring; the top spring plate, that is concentric and axially adjacent to, and assembled axially outward of, the segmented bead molding ring; the bottom spring plate, that is concentric and axially adjacent to, and assembled axially outward of the top spring plate; an annular adapter plate, that is concentric and radially adjacent to, and assembled radially outward of, the bottom spring plate; and one of the sidewall plates, that is concentric and axially adjacent to, and assembled axially inward of the adapter plate. Preferably, the adapter plate is removably attached to the bottom spring plate by means of a tongue protruding from a radially inner periphery of the adapter plate to be trapped in a groove between flanges and a radially outer periphery of the bottom spring plate; and the adapter plate has an annular registration lip protruding axially toward the adjacent one of the sidewall plates for holding the one of the sidewall plates concentrically aligned to the adapter plate.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
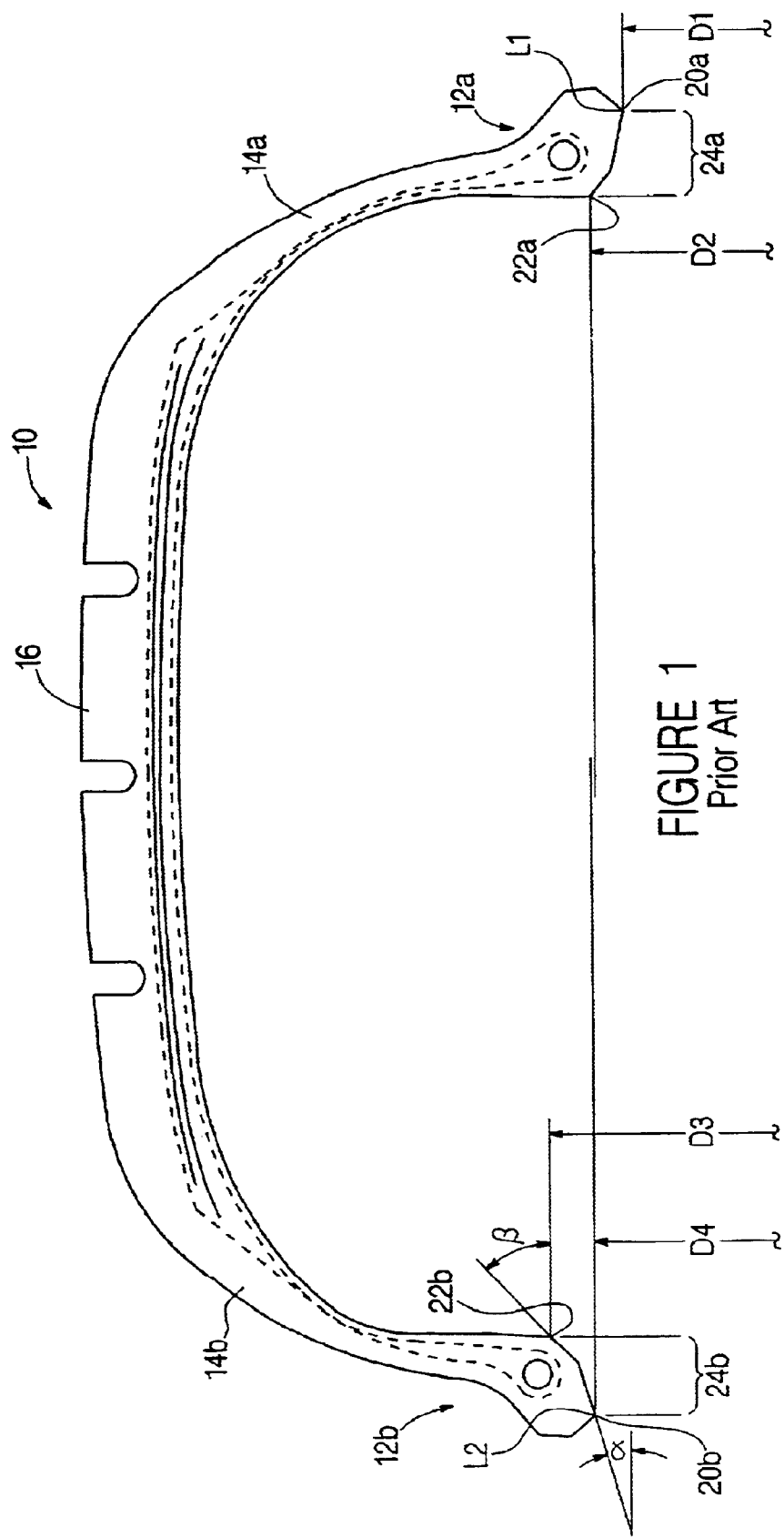
Figure 2:
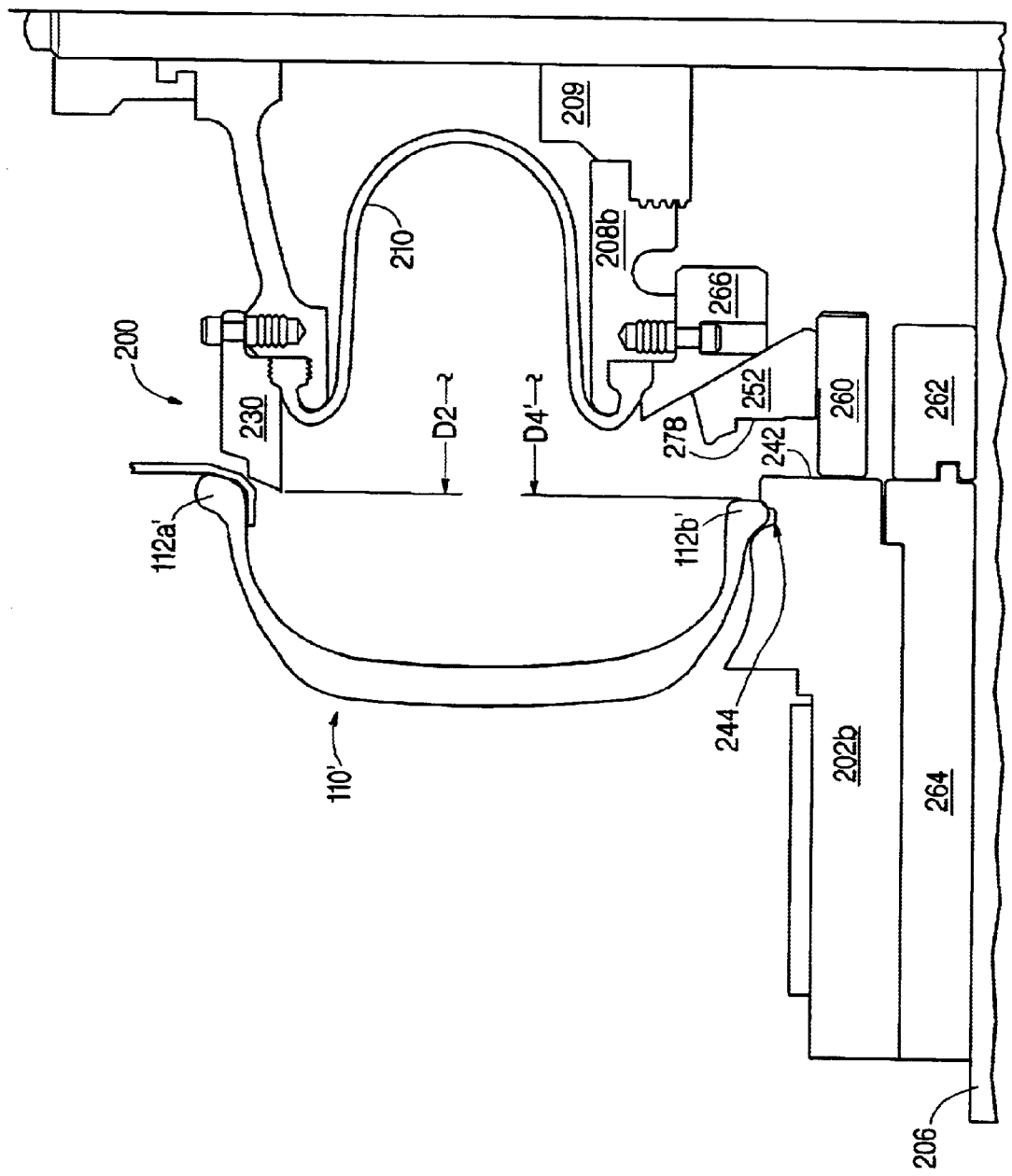
Figure 3B:
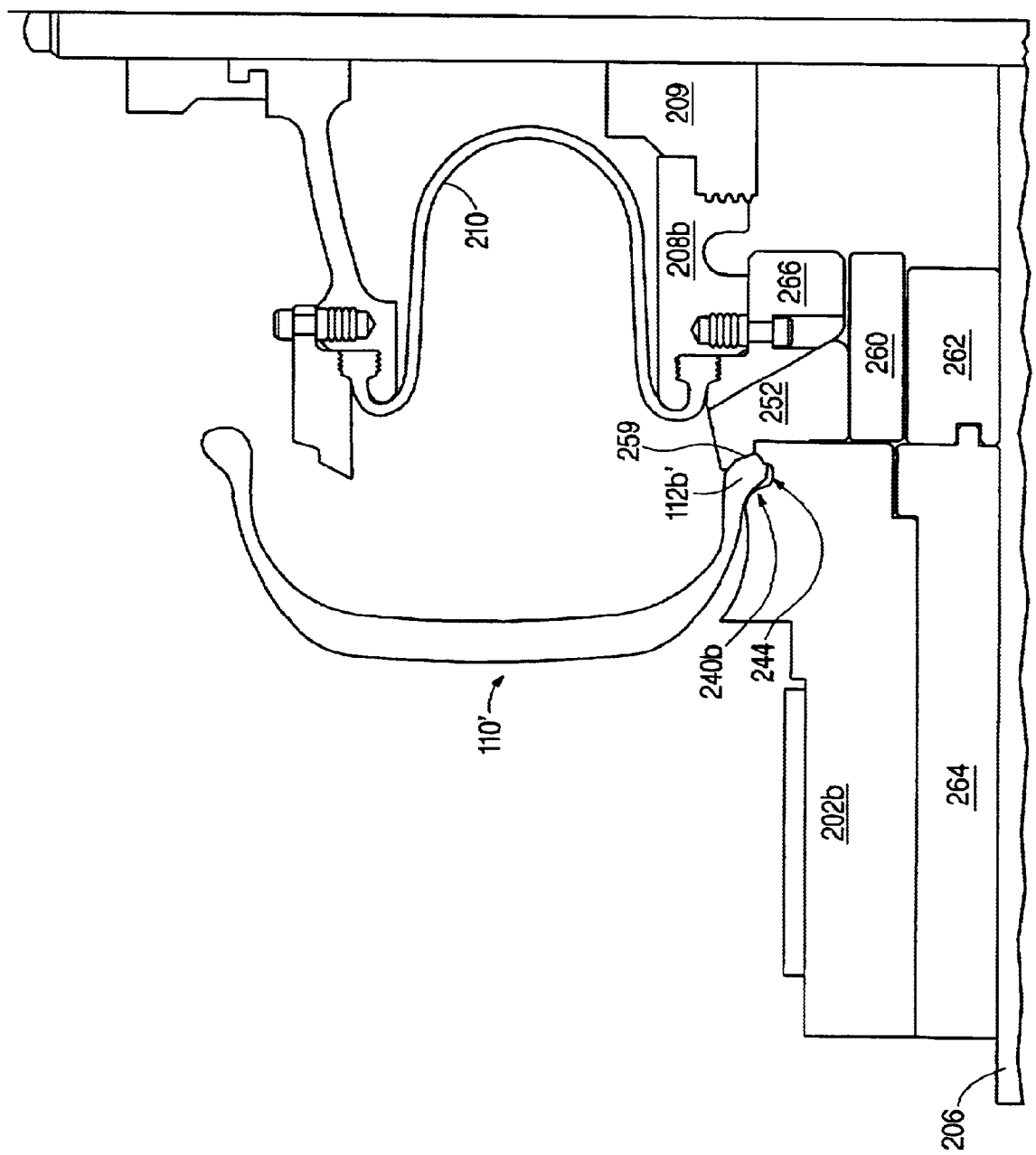
Figure 4:
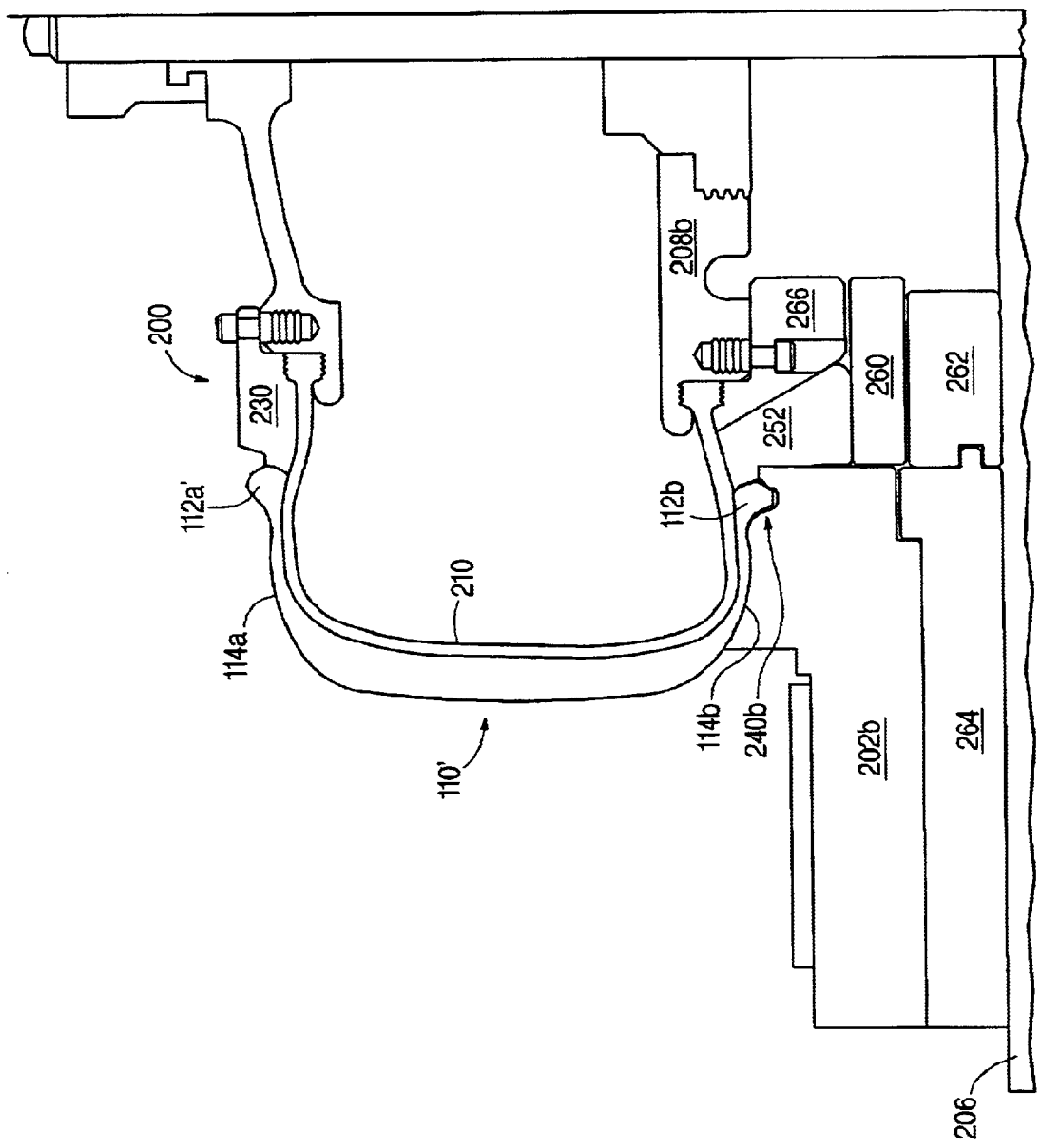
Figure 5:
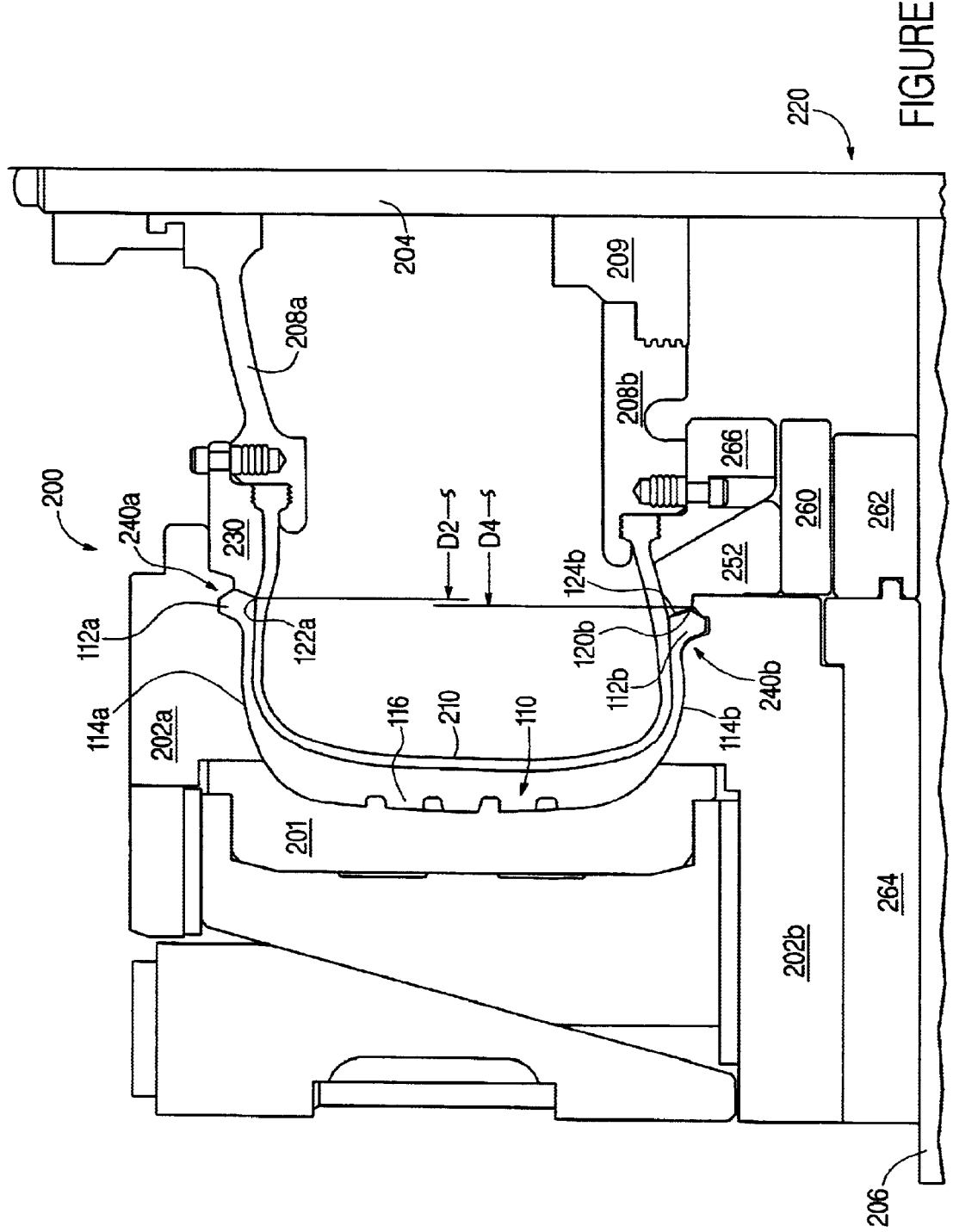
Figure 6B:
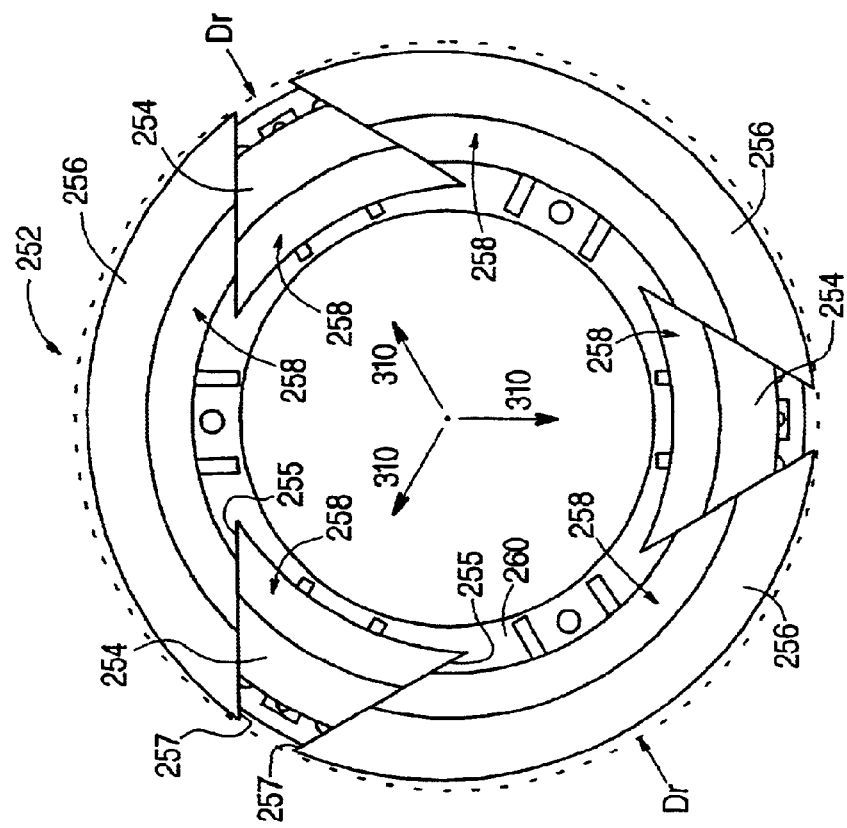
Figure 6A:
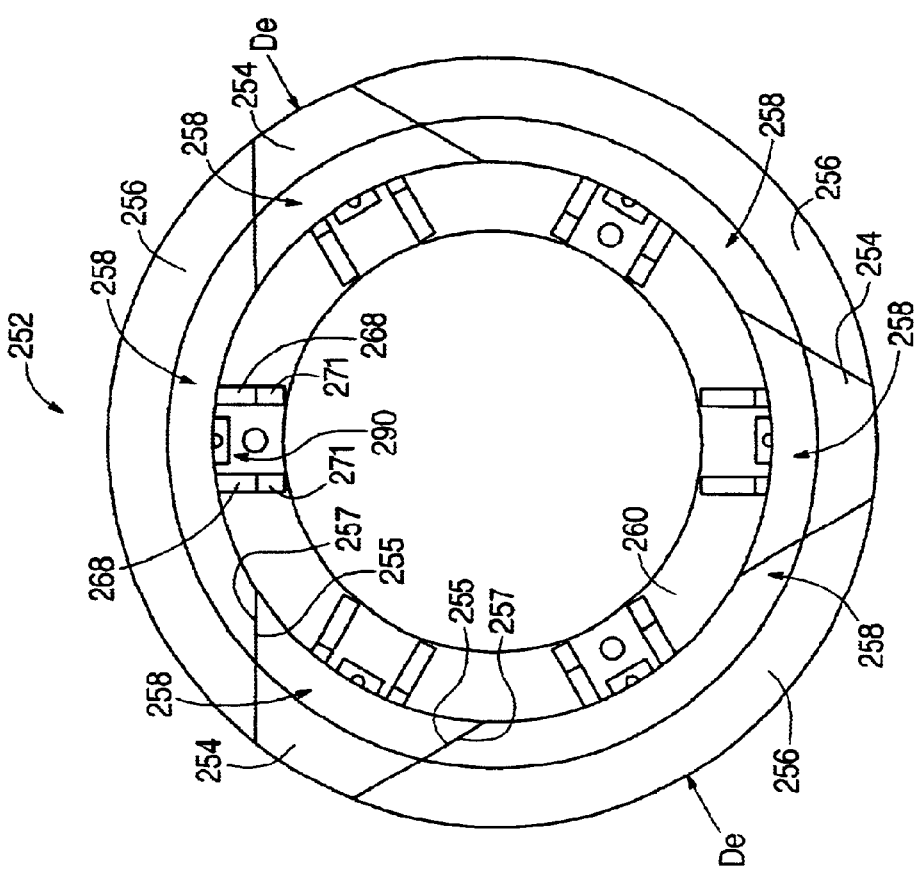
Figure 7:
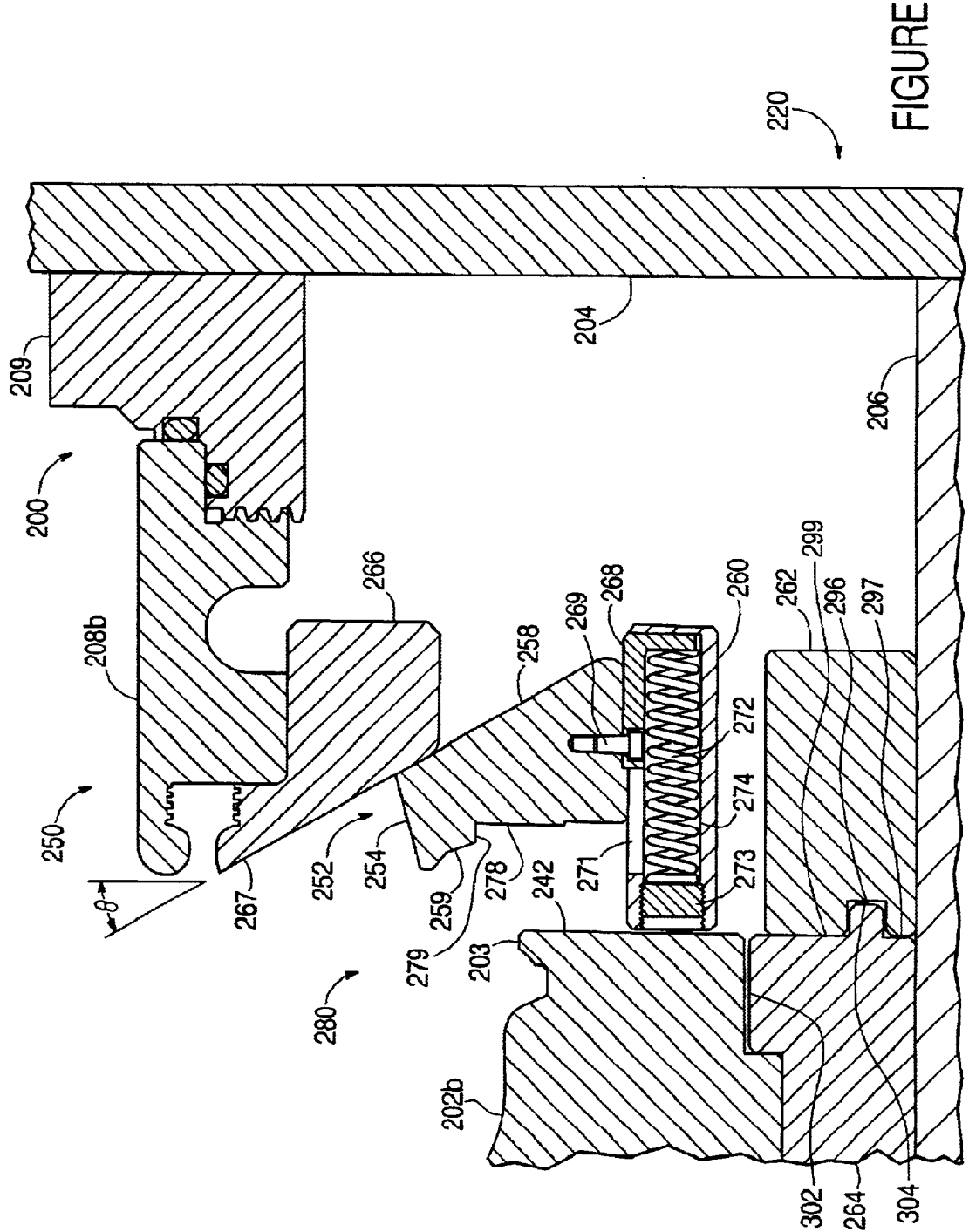
Figure 8A:
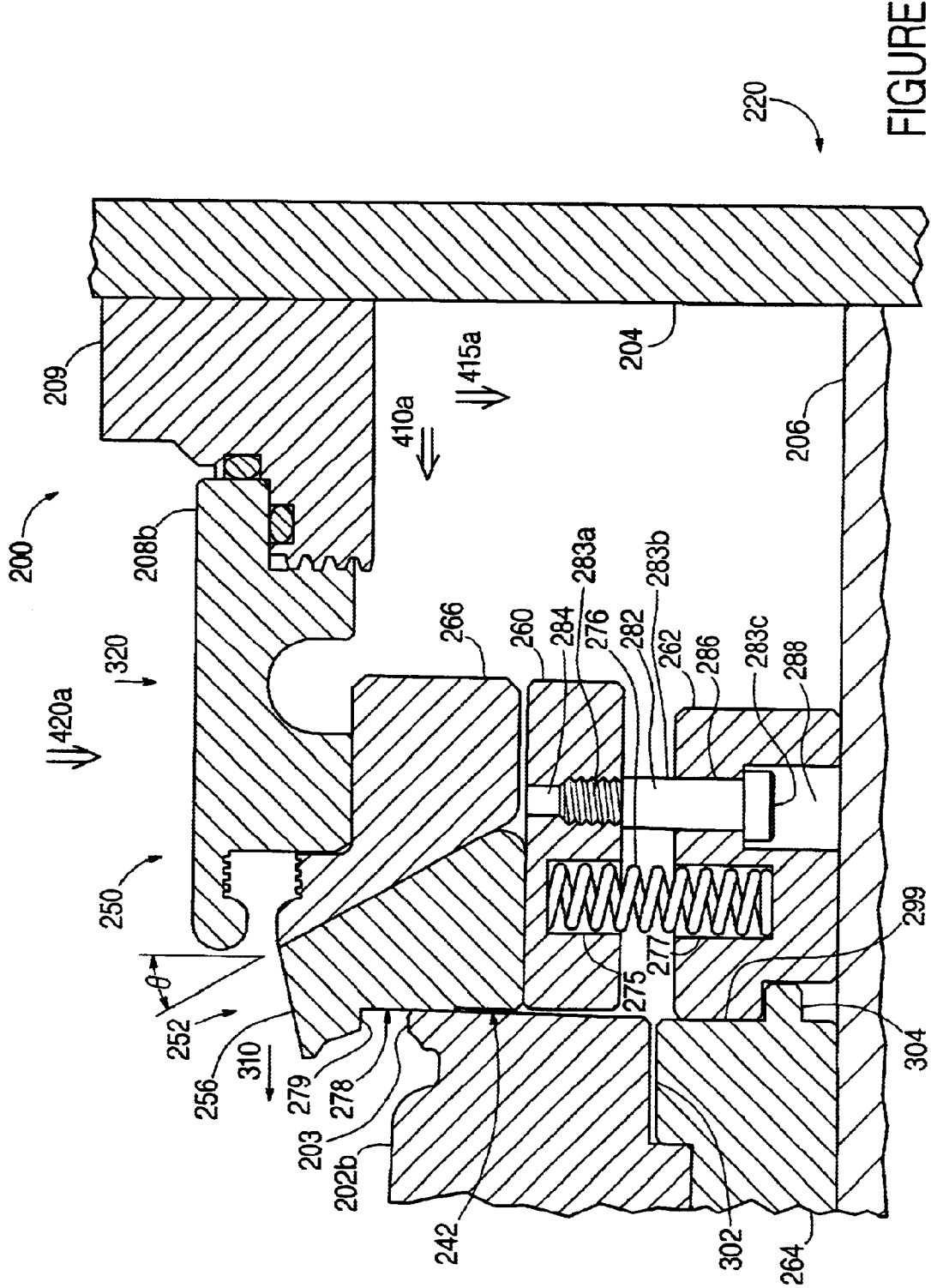
Figure 8B:
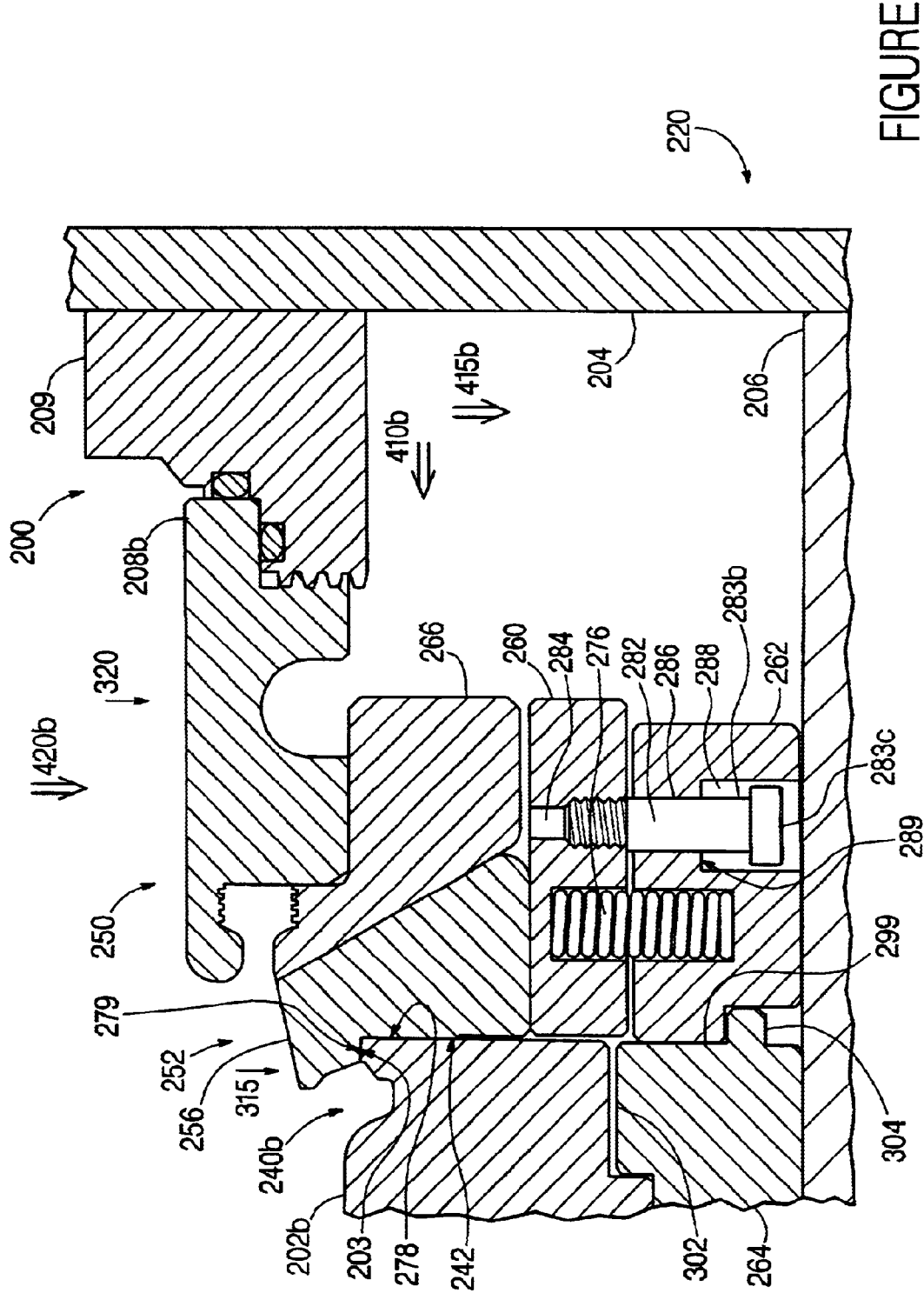
Figure 9:
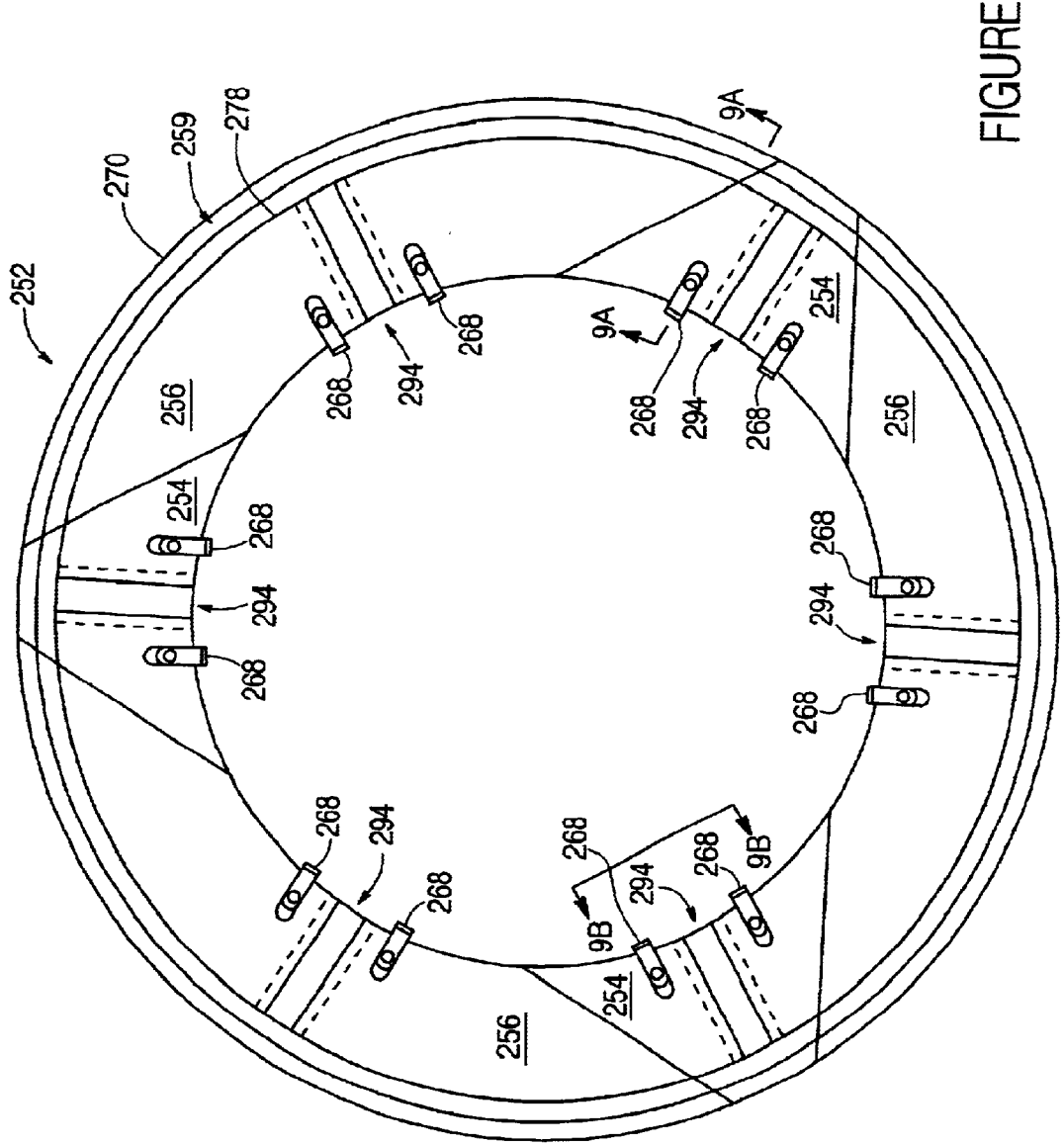
Figure 10:
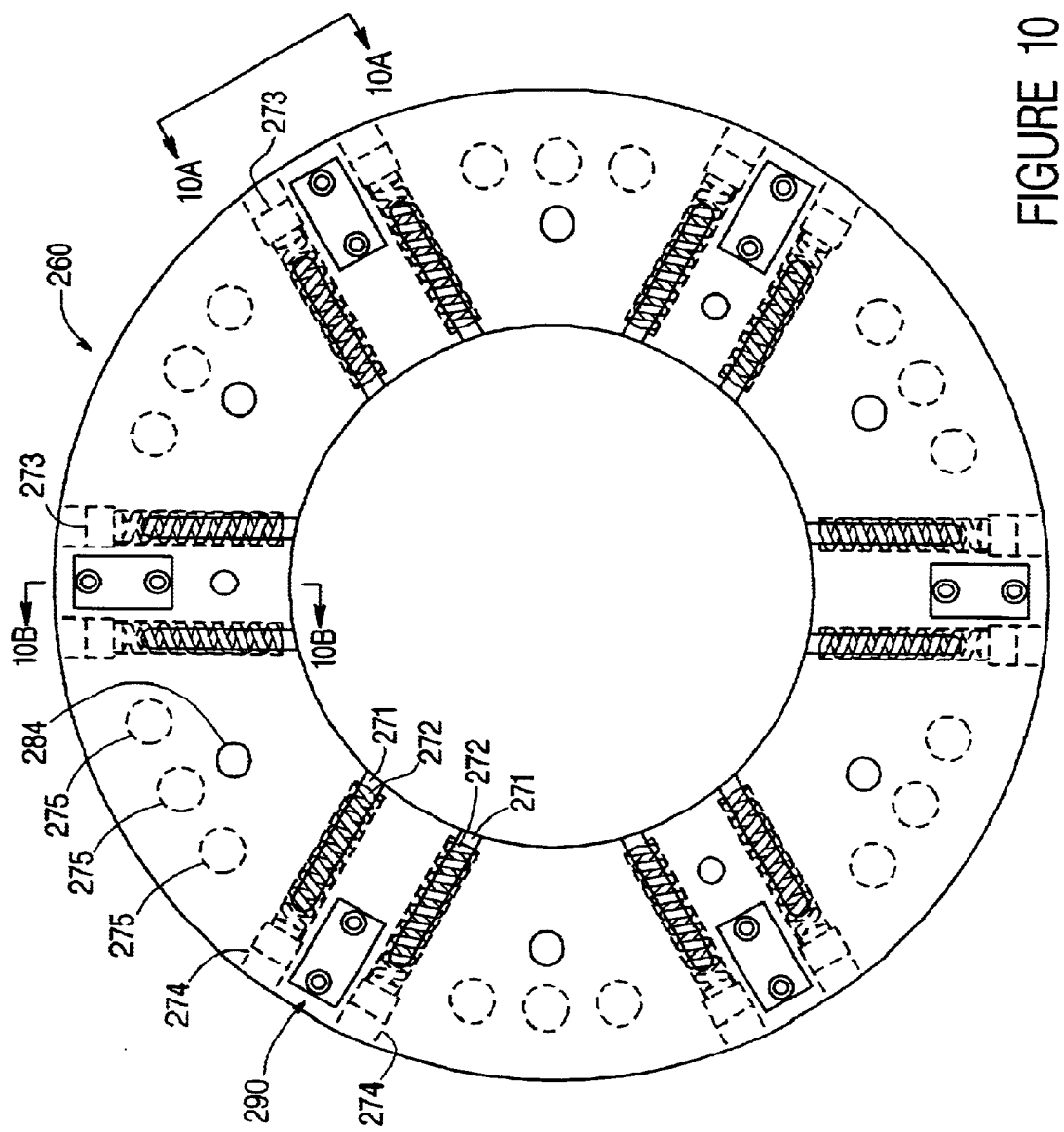

The structure, operation, and advantages of the present preferred embodiment of the invention will become further apparent upon consideration of the following description taken in conjunction with the accompanying drawings, wherein:

FIG. 1 is a meridional cross-sectional view, shading omitted for clarity of detail, of a prior art tire having undercut bead bases and asymmetric bead diameters;

FIG. 2 is a cross-sectional view, shading omitted for clarity of detail, of a portion of a mold with the unmolded tire being loaded, according to the invention;

FIG. 3A is a cross-sectional view, shading omitted for clarity of detail, of a portion of a mold showing a bead molding ring radially expanded in a first stage of a two-stage process for engaging the bead molding ring with the unmolded bottom bead, according to the invention;

FIG. 3B is a cross-sectional view, shading omitted for clarity of detail, of a portion of a mold showing the bead molding ring moved axially outward to complete a second stage of a two-stage process for engaging the bead molding ring with the unmolded bottom bead, according to the invention;

FIG. 4 is a cross-sectional view, shading omitted for clarity of detail, of a portion of a mold with a vulcanizing membrane inflated to pull the sidewalls and beads into molding position, according to the invention;

FIG. 5 is a cross-sectional view, shading omitted for clarity of detail, of a portion of a mold with the mold being closed around the tire for molding, according to the invention;

FIG. 6A is a top view of a segmented bead molding ring in an expanded state and resting on a top spring plate, according to the invention;

FIG. 6B is a top view of the segmented bead molding ring in a retracted state and resting on the top spring plate, according to the invention;

FIG. 7 is a detailed cross-sectional view of a portion of the mold of FIG. 2 (tire and vulcanizing membrane omitted), showing key elements of the expandable bead molding ring assembly when it is disengaged and retracted in the mold, with the cross-section taken on a different radius line than FIG. 2 in order to show radial spring elements of the expandable bead molding ring assembly, according to the invention;

FIG. 8A is a detailed cross-sectional view of a portion of the mold of FIG. 3A (tire and vulcanizing membrane omitted), showing key elements of the expandable bead molding ring assembly when it is radially expanded in the mold, with the cross-section taken on a different radius line than FIGS. 3A and 7 in order to show axial spring elements of the expandable bead molding ring assembly, according to the invention;

FIG. 8B is a detailed cross-sectional view of a portion of the mold of FIG. 3B (tire and vulcanizing membrane omitted), showing key elements of the expandable bead molding ring assembly when it is moved axially outward in the mold, with the cross-section taken on a different radius line than FIG. 3B in order to show axial spring elements of the expandable bead molding ring assembly, according to the invention;

FIG. 9 is a bottom view of the expanded segmented bead molding ring also shown in the top view of FIG. 6A but without the top spring plate, according to the invention;

FIG. 9A is a cross-sectional view taken along the 9A—9A line of FIG. 9, showing a cross-sectional profile common to all of the segments of the segmented bead molding ring, according to the invention;

FIG. 9B is a radial side view taken along the 9B—9B line of FIG. 9, showing tee-slot and spring hook features common to all of the segments of the segmented bead molding ring, according to the invention;

FIG. 10 is a top view of the top spring plate also shown in the top view of FIG. 6A but without the segmented bead molding ring resting on it, according to the invention;

FIG. 10A is a cross-sectional view taken along the 10A—10A line of FIG. 10, showing a cross-sectional profile of a typical one of the guide tees mounted on the top spring plate, according to the invention;

FIG. 10B is a radial side view taken along the 10B—10B line of FIG. 10, according to the invention;

FIG. 11 is a top view of a bottom spring plate for assembling underneath the top spring plate, according to the invention;

FIG. 11A is a cross-sectional view taken along the 11A—11A line of FIG. 11, showing a cross-sectional profile of a typical guide hole and spring pocket, according to the invention;

FIG. 11B is a cross-sectional view taken along the 11B—11B line of FIG. 11, showing a cross-sectional profile of a typical flange, according to the invention;

FIG. 11C is a radial side view taken along the 11C—11C line of FIG. 11, showing a flange with a keyhole, according to the invention;

FIG. 12 is a top view of an adapter plate for assembling underneath a sidewall mold plate and annularly around the outside circumference of the bottom spring plate of FIG. 11, according to the invention; and FIG. 12A is a cross-sectional view taken along the 12A—12A line of FIG. 12, showing a cross-sectional profile including a typical tongue element, according to the invention.

DETAILED DESCRIPTION OF THE INVENTION

In FIG. 1 a tire 10 of the prior art (see U.S. Pat. No. 6,092,575) is shown in meridional cross-section. The tire 10 comprises a tread 16, first and second beads 12a and 12b, respectively, and two sidewalls 14a and 14b extending between the tread 16 and the beads 12a and 12b, respectively. The beads 12a, 12b are undercut and the tire is asymmetric, having different bead diameters. Each bead 12a, 12b has a heel 20a, 20b, respectively, a toe 22a, 22b, respectively, and a bead base 24a, 24b, respectively, extending between the heel 20a, 20b and toe 22a, 22b. Typically a tire's bead base is planar from heel to toe, but it can have multiple surfaces as illustrated in FIG. 1. The undercut nature of the beads 12a, 12b is characterized by one or more acute bead base angles α, β that open axially inward. As a consequence, the bead diameter at the heel (the axially outermost extent of the bead base) is less than the bead diameter at the toe (the axially innermost extent of the bead base), i.e., bead heel diameter D1 is less than bead toe diameter D2 for the first bead 12a, and bead heel diameter D4 is less than bead toe diameter D3 for the second bead 12b. The asymmetric nature of the tire 10 is characterized in that the nominal diameters of the two beads 12a, 12b are different. More particularly, for the tire 10 as illustrated, the bead toe diameter D2 of the first bead 12a is less than the bead heel diameter D4 of the second bead 12b. The radially inner limits of the beads 12a and 12b are labeled L1 and L2, respectively. These limits correspond to the point where the tire diameter is least. Thus, for the bead 12a, the diameter at the limit L1 is D1. For the bead 12b, the diameter at the limit L2 is D4. This tire construction allows mounting on special wheel rims, and also provides advantages in tire molding, as will be described hereinbelow. The present invention will be described in a preferred embodiment that advantageously molds green (unvulcanized) tires that have undercut beads and asymmetric bead diameters such as for the prior art tire 10 of FIG. 1. It should be understood that the present invention is not limited to the molding of such tires. Rather, the present invention can provide improvements and benefits compared to the prior art when used in any tire mold, particularly molds wherein the use of a radially expandable bead molding ring is desired. For example, two radially expandable bead molding rings, according to the present invention, could be used in a mold for tires with normal, symmetric bead diameters and any bead base profile, but especially for undercut bead bases that cannot be molded without positioning at least a portion of the bead molding rings axially inward of the beads. Or, for example, two radially expandable bead molding rings according to the present invention could be used to grip inside portions of the beads in order to allow tire molding in "membrane-less vulcanizing presses" such as those described in U.S. Pat. No. 4,236,883.

The detailed description will include certain directional terms, including "radial", "axial", "meridional", "inward", and "outward". These terms are well known for tires, and when used herein with respect to tire molds and mold presses the terms should be understood in an analogous way wherein a center post of the mold press is located at the axis of rotation of the mold as well as that of a tire placed in the mold. Thus "axial" directions are directions parallel to the center post and parallel to the axis of rotation of a tire placed in the mold. Likewise, a radial direction is in the direction of a radius line originating at the axis of rotation of the mold that is also the axis of a tire placed in the mold. Similarly, "inward", "outward" and related terms are relative to the interior cavity of the mold and/or the tire.

FIGS. 2, 3A, 3B, 4, and 5 (FIGS. 2–5) illustrate key steps of the preferred embodiment of the inventive molding process carried out on a tire 110, as shown in meridional cross-section for one half of the tire 110 and mold 200 in a mold press 220. Referring first to FIG. 5, showing the tire 110 being molded, it can be seen that the tire 110 is similar to the tire 10, having undercut beads 112a, 112b (collectively referred to as 112) and asymmetric bead diameters such that the diameter D4 at the heel 120b of the bottom bead 112b is greater than or equal to the diameter D2 at the toe 122a of the top bead 112a. This particular bead diameter asymmetry enables the use of a solid (continuous ring, not segmented) top bead molding ring 230 such as the continuous counter molding ring (13) of the prior art '193 patent. An inventive expandable bead molding ring assembly 250 is utilized for molding the bottom bead 112b. The expandable bead molding ring assembly 250 is defined hereinbelow.

For the sake of simplicity and clarity in FIGS. 2–5, cross-section shading of parts is omitted, as are the internal elements of the tire 110. The tire 110 has beads 112, a tread 116, and sidewalls 114a, 114b (collectively referred to as 114) extending between the tread 116 and each bead 112.

The axially outer surface of the sidewalls of a tire, including the beads, is generally molded by a part called a sidewall plate, illustrated as a top sidewall plate 202a and a bottom sidewall plate 202b, referred to collectively as sidewall plates 202. A sidewall plate 202 starts from the position of least diameter, conventionally the radially innermost tip of the bead 112, and extends about to the shoulders of the tire. In fact, sometimes elements independent of the sidewall plates 202 are used to mold the axially outer face of a bead 112, but in the context of the present invention, it is immaterial whether the part molding the outer surface of the bead 112 is integrated with the sidewall plate 202 or separate from it.

The loading, molding, and release of a tire 110 involve relative motions in an axial direction between the tire 110 and each of the sidewall plates 202 molding it. In FIGS. 2–5, it is readily seen that the shape to be imparted to the outer surface of the beads 112 and sidewalls 114 is compatible with relative motion in an axial direction between each of the sidewall plates 202 and the tire 110. The undercut bead design creates axially-inward facing portions of the beads 112 that must be molded to a shape that cannot be imposed with the desired accuracy by means of a vulcanizing membrane 210. Hence, the use of additional rigid molding parts, the bead molding rings, is required. In the preferred embodiment shown in the drawings, the top bead molding ring 230 is a continuous ring, and the bottom bead molding ring 252 is a segmented ring. The fact that the ring for molding the bead of greater diameter is a segmented ring makes it possible to mold undercut beads, such as the illustrated beads 112. The bead molding rings 230, 252 are thus intended to mold the portion of each of the beads 112 from the point where the sidewall plates 202 end their molding effect, inward to the point where the vulcanizing membrane 210 can begin effective molding.

In the mold 200 proposed for the preferred embodiment of the present invention, the value of the diameter D2 for the bead 112a of lesser diameter is less than or equal to the diameter D4 for the bead 112b of greater diameter. Hence, it is possible to pass the continuous bead molding ring 230 inside the opposite bead 112b. This continuous bead molding ring 230 is made in one piece. On the other side, the segmented bead molding ring 252 is made in several segments: a group of first segments 254 and a group of second segments 256. This enables the segmented bead molding ring 252 to be retracted so that the tire 110 can be placed in the mold 200 and be extracted after vulcanizing.

More specifically, FIGS. 6A and 6B show that the bead molding ring 252 comprises a number N of first segments 254 (here N=3), and a like number N of second segments 256 complementary to, and circumferentially alternated with, the first segments 254. The first segments 254 (also known as wedge segments) are wedge shaped, having circumferentially lateral faces 255 that converge towards a radially outward-facing bead molding surface (259 as seen in the cross-sectional view of FIG. 9A) of the bead molding ring 252, the first segment lateral faces 255 being planar and oriented in the axial direction. The second segments 256 have lateral faces 257 that are complementary to the lateral faces 255 of the first segments 254. To avoid clutter in the drawings, the lateral faces 255 and 257 are only labeled with numbers around one of the first segments 254 at the top of FIGS. 6A and 6B, but it should be understood that similar labeling applies to all of the segments 254 and 256. FIG. 6A shows the segmented bead molding ring 252 in a radially expanded state, and FIG. 6B shows the segmented bead molding ring 252 in a radially retracted state. It can be seen that pushing radially outward (direction 310) on the first segments 254 causes the first segments 254 to wedge between the second segments 256 and to push them radially outward also. The segmented bead molding ring 252 is radially expandable from a retracted outside diameter $D_r$ (outlined in FIG. 6B with a dotted circle) to an expanded outside diameter $D_e$. The retracted outside diameter $D_r$ is less than or equal to the inside diameter D4' (see FIG. 2) of an unmolded bead 112b' that is to be molded by the segmented bead molding ring 252. When expanded to the expanded outside diameter $D_e$, the segmented bead molding ring has a circumferentially continuous radially outward-facing surface 259 for molding the bead 112b', typically to form the bead base 124b.

Finally, for molding the rest of the inner cavity of the tire 110, a vulcanizing membrane 210 is used, membrane vulcanizing being a long used and proven technique. Also, the mold 200 utilizes multiple sectors 201 (e.g., sixteen sectors), movable relative to the sidewall plates 202, to mold the outer surface of a tread 116.

The mold 200 is used in conjunction with a press 220 comprising a base 206 on which is fixed the bottom sidewall plate 202b, and a center post 204. For the present invention, an adapter plate 264 is fixed between the bottom sidewall plate 202b and the press base 206. The press 220 also comprises a movable frame (not shown), also called the top frame, to which is fixed the top sidewall plate 202a. Here, certain parts of the press 220, mold 200, and tire 110 are referred to by the adjectives "bottom" and "top" to correspond to the usual terminology, because the presses are generally built to receive a mold positioned with its axis vertical. Of course, the "bottom" or "top" description of parts of the press 220, mold 200, and tire 110 is not limiting, and these terms are employed only to use conventional terminology.

The mold 200 uses a symmetrical vulcanizing membrane 210, but the symmetry of the membrane is not restrictive. The top end of the vulcanizing membrane 210 is clamped between the top bead molding ring 230 and a top clamp ring 208a that is movably attached to the center post 204. At its bottom end, the vulcanizing membrane 210 is clamped between a bottom lock ring 266, and a bottom clamp ring 208b that is movably attached to the center post 204 by a hub 209 that slides up and down (axially). The bottom lock ring 266 has a special shape (frustraconical) and function according to the invention, as will be described hereinbelow.

The press 220 generally includes other standard elements, not illustrated but well known, that supply vulcanizing heat and pressure, as well as providing required motions to the parts of the mold 200 and press 220. In particular, the hub 209 is generally caused to slide up and down on the center post 204 at various times during the molding process. The present invention utilizes this standard movement capability to drive engagement and disengagement of the inventive expandable bead molding ring assembly 250 with the bottom bead 112b.

The inventive molding process will now be described with reference to FIGS. 2–5, which illustrate key steps of the process.

First, as illustrated in FIG. 2, an unmolded, unvulcanized tire 110' is loaded down into the mold 200, which is in an opened, loading state. The vulcanizing membrane 210 is deflated and folded inward out of the way, and the tread sectors 201 (not shown) and upper sidewall plate 202a (not shown) are also moved to a non-obstructing position, according to standard practice. The unmolded lower bead 112b' has an inner diameter D4' that is large enough to pass over the continuous top bead molding ring 230 that has a maximum outside diameter D2, which is less than or equal to the diameter D4'. This allows the non-segmented, non-expandable top bead molding ring 230 to be axially inside the unmolded top bead 112a'. The unmolded bottom bead 112b' comes to rest in a bead molding portion 244 of the bottom sidewall plate 202b, after passing over the bottom, segmented bead molding ring 252 so that the segmented bead molding ring 252 is axially inside the unmolded bottom bead 112b'. The segmented bead molding ring 252 is retracted and disengaged, as allowed by a vertical upward movement of the bottom lock ring 266 that is pulled upward by the bottom clamp ring 208b and hub 209 to which the bottom lock ring 266 is attached. The disengagement of the segmented bead molding ring 252 is driven by springs as detailed hereinbelow, and comprises two stages of movement: a vertical (axially inward) raising movement, and a radial retraction (as shown in FIG. 6B). It can be seen that, in its disengaged state, the segmented bead molding ring 252 is positioned radially inward of, and also above (axially inward of) the unmolded bottom bead 112b' that rests in the bead molding portion 244 of the bottom sidewall plate 202b.

Next, as illustrated in FIG. 3A, the segmented bead molding ring 252 is radially expanded (as shown in FIG. 6A) in a first stage of movement, wedged radially outward in reaction to a vertical downward movement of the bottom lock ring 266 that is pushed downward by the bottom clamp ring 208b and hub 209 to which the bottom lock ring 266 is attached. The segments 254, 256 of the segmented bead molding ring 252 are restricted to move only in a radial direction by guide tees (not shown in FIG. 3A) as detailed hereinbelow, and are limited in the extent of their radial motion by contact of an outer stop surface 278 of the segmented bead molding ring 252 with a radially inner surface 242 of the bottom sidewall plate 202b.

Next, as illustrated in FIG. 3B, the segmented bead molding ring 252 is engaged with the bead 112b' in a second stage of movement, pressed axially outward (downward) in reaction to further vertical downward movement of the bottom lock ring 266 that is pushed downward by the bottom clamp ring 208b and hub 209 to which the bottom lock ring 266 is attached. In the engaged state, the segmented bead molding ring 252 places its circumferentially continuous bead molding surface 259 in a position to work with the adjacent bead molding portion 244 of the bottom sidewall plate 202b to form a bottom bead molding pocket 240b that will mold all surfaces of the bottom bead 112b' except the interior surfaces that are moldable by the vulcanizing membrane 210. In the second stage of movement, the segments 254, 256 of the segmented bead molding ring 252 are restricted to move only in an axial direction by guide bolts (not shown in FIG. 3B) as detailed hereinbelow.

Even though the unmolded bead 112b' may have a poorly defined shape, the two stage engagement movement of the inventive expandable bead molding ring 252 causes the bead molding ring 252 to first form a continuous molding surface 259 within the cavity of the unmolded tire 110' and secondly to move axially outward, effectively "gathering" (including centering) the unmolded bottom bead 112b' into the bottom bead molding pocket 240b.

Next, as illustrated in FIG. 4, the vulcanizing membrane 210 is inflated within the unmolded tire 110'. The bottom bead 112b is held in the bottom bead molding pocket 240b by the segmented bead molding ring 252, so that when radially outward pressure from the expanding vulcanizing membrane 210 causes the sidewalls 114 and therefore the beads 112 to draw axially inward, the unmolded top bead 112a' will be pulled downward against the (top) continuous bead molding ring 230.

Finally, as illustrated in FIG. 5, the molding of the tire 110 is completed in a conventional manner, closing the mold 200 around the tire 110 by moving the tread-molding sectors 201 and the top sidewall plate 202a into place. Pressure and heat are applied in conventional manner, utilizing the mold press 220 and the vulcanizing membrane 210. When the top sidewall plate 202a is in place, it works with the adjacent continuous bead molding ring 230 to form a top bead molding pocket 240a that will mold all surfaces of the top bead 112a except the interior surfaces that are moldable by the vulcanizing membrane 210.

With reference to FIGS. 6A, 6B, 7, 8A, 8B, 9, 9A, 9B, 10, 10A, 10B, 11, 11A, 11B, 11C, 12 and 12A (FIGS. 6A–12A) details of the inventive expandable bead molding ring assembly 250 will be presented. In general, the key elements of the bead molding ring assembly 250 are the segmented bead molding ring 252 comprising first segments 254 and second segments 256 (see FIGS. 6A, 6B, 9, 9A, 9B); a top spring plate 260 with radial compression springs 272 and guide tees 290 (FIGS. 6A, 6B, 10, 10A, 10B); a bottom spring plate 262 with axial compression springs 276 and guide bolts 282 (FIGS. 8A, 8B, 11, 11A, 11B, 11C); the adapter plate 264 (FIGS. 12, 12A); and the bottom lock ring 266 (FIGS. 7, 8A, 8B). The elements of the bead molding ring assembly 250 are readily removable, so that some or all of the elements may be easily changed according to the desired dimensions and profile to be molded on the corresponding bead of the tire. The segmented bead molding ring 252, the top spring plate 260, and the bottom spring plate 262 form an easily removed subassembly, that is, in turn, easily attached to the adapter plate 264 that is assembled with the bottom sidewall plate 202b. Therefore, mold changeover is greatly simplified: the segmented bead molding ring 252, the top spring plate 260, and the bottom spring plate 262 may be changed out as a subassembly, or the entire assembly of the segmented bead molding ring 252, the top spring plate 260, the bottom spring plate 262, the adapter plate 264 and the bottom sidewall plate 202b may be changed out as an assembly. The bottom lock ring 266 is usable with a variety of segmented bead molding rings 252 that have different bead molding surfaces 259 and different expanded outside diameters D, but, if desired, the bottom lock ring 266 can also be easily removed by un-bolting it from the bottom clamp ring 208b.

The key elements of the present invention are seen with the elements assembled together in representative cross-sectional views in FIGS. 7, 8A and 8B, and detailed drawings of the elements are shown individually in various plan and cross-sectional views in FIGS. 6A, 6B, 9, 9A, 9B, 10, 10A, 10B, 11, 11A, 11B, 11C, 12 and 12A.

FIGS. 6A and 6B, also discussed hereinabove, show a top view of the segmented bead molding ring 252 resting on the top spring plate 260. FIG. 6A shows the segments 254 and 256 positioned when the segmented bead molding ring 252 is in its expanded state, and FIG. 6B shows the segments 254 and 256 positioned when the segmented bead molding ring 252 is in its retracted state. In the preferred embodiment, the first segments 254 and the second segments 256 differ only in their circumferential extent and in the orientation of their circumferentially lateral faces 255 and 257, respectively, as discussed hereinabove. The solid lines in FIGS. 6A and 6B represent profile edges or corners that are visible in top view. A radially inner surface of the segmented bead molding ring 252 is a cam surface 258 that slopes from the top radially inward and axially outward (downward as illustrated) to form an annular surface complementary to a frustraconical section. Certain other elements (268, 271 and 290) that act between the segments 254, 256 and the top spring plate 260 are also visible in FIGS. 6A and 6B. Although the reference numbers 268, 271 and 290 are only shown for their corresponding elements in one segment 256 of the segmented bead molding ring 252 in FIG. 6A, they should be understood to apply to corresponding elements in all of the segments 254, 256 depicted in FIGS. 6A and 6B. A guide tee 290 holds each segment against the top spring plate and confines segment motion to radial directions (e.g., direction 310). Spring hooks 268 (two per segment) hook down through hook slots 271 to interact with radial springs (not shown in this view) that are contained within the top spring plate 260.

FIG. 9 shows a bottom view of the segmented bead molding ring 252 in the expanded state (comparable with the top view of FIG. 6A). Three wedge segments 254 (first segments) alternate with three second segments 256. A tee guide-slot 294 is radially oriented in the center of each segment 254, 256, and spring hooks 268 are attached at points equidistant on either side of the tee guide-slot 294 in each segment 254, 256. Characteristics 270, 259, and 278 of the radially outer profile of the segmented bead molding ring 252 are indicated but will be explained hereinbelow with reference to a cross-sectional view (FIG. 9A).

A cross-section taken along the 9A—9A line in FIG. 9 is shown in FIG. 9A, which illustrates a cross-sectional profile common to both the first segments 254 and the second segments 256. The cross-section is shown in the same orientation as FIG. 9, i.e., "upside-down" with the axially outer (bottom) surface shown on top. The radially outermost surface of the segmented bead molding ring 252 is the bead molding surface 259, typically shaped to mold the bead base 124b. The bead molding surface 259 may be any desired shape, possibly including a tip 270 to provide multiple angles to the bead base 124b, for example the bead base angles α and β illustrated in FIG. 1 for the prior art tire 10. Axially outward from the bead molding surface 259 is a horizontal surface that functions as a lower stop surface 279, and a vertical surface that functions as the outer stop surface 278, for stopping axially outward and radially outward movement, respectively, of the segments 254, 256 of the segmented bead molding ring 252. A radially inner surface of the segmented bead molding ring 252 is the cam surface 258 that slopes radially inward and axially outward (upward as illustrated), at an angle θ to form an annular surface complementary to a frustraconical section. The spring hook 268 is attached to the segment 254 by a screw 269.

A radial side view taken along the 9B—9B line in FIG. 9 is shown in FIG. 9B. Spring hooks 268 are shown on either side of the tee-shaped tee guide-slot 294 in the segment 254 typical of the segments 254, 256 of the segmented bead molding ring 252. Surfaces 295a and 295b inside the tee guide-slot 294 will be discussed further hereinbelow with reference also to FIG. 10A.

FIG. 10 shows a top view of the top spring plate 260. The reference numbers that are applied to elements in the upper left portion of the drawing should be understood to apply similarly to all such elements around the top spring plate 260. Six guide tees 290 are attached in angular positions that correspond to the angular positions of the tee guide-slots 294 in the segmented bead molding ring 252 that rests above the top spring plate 260 when they are assembled as shown in FIGS. 6A and 6B. Equidistant on either side of each guide tee 290 are radial springs 272 held in radially-aligned spring holding holes 274 that have hook slots 271 providing an opening along the top side of each spring holding hole 274. The spring holding holes 274 and hook slots 271 are positioned correspondingly with the spring hooks 268 that are attached beneath the segmented bead molding ring 252 that rests above the top spring plate 260 when they are assembled as shown in FIGS. 6A and 6B. Threaded mounting holes 284 are provided at regular intervals (e.g., 6 places) for screwing in place guide bolts 282 (best seen in FIGS. 8A and 8B, and further discussed hereinbelow). One or more (e.g., three) top axial spring pockets 275 are also provided at regular intervals (e.g., 6 places) having pocket-holes opening downward for containing the upper end of axial springs 276 (best seen in FIGS. 8A and 8B, and further discussed hereinbelow).

A radial side view taken along the 10A—10A line in FIG. 10 is shown in FIG. 10A. The spring holding holes 274 are shown with spring holding plugs 273 inserted in them. The spring holding plug 273 is preferably a self-locking, socket-head threaded plug that can be screwed into the end of the spring holding hole 274 to hold the radial spring 272 in the spring holding hole 274 (as shown in FIG. 10). The guide tee 290 is shown screwed to the side of the top spring plate 260 by screw 292. The guide tee 290 could be a single piece of machined metal or comprised of two pieces: a crossbar 291a, and a standoff 291b. The standoff 291b is narrower than the crossbar 291a to provide a "tee" shape that allows for important tee guide surfaces 293a and 293b. The guide tee 290 is shaped and dimensioned to fit inside the guide slot 294 (see FIG. 9B) in a way that holds the segments 254, 256 of the segmented bead molding ring 252 at a fixed axial distance above the top spring plate 260 while also allowing the segments 254, 256 to slide radially in and out. The axially outer (lower) surfaces of the crossbar 291a provide tee axial guide surfaces 293a that slide against corresponding slot axial guide surfaces 295a to prevent axial relative movement between the segments 254, 256 of the segmented bead molding ring 252 and the top spring plate 260. The circumferentially side surfaces of the crossbar 291a provide tee radial guide surfaces 293b that slide against corresponding slot radial guide surfaces 295b to restrict relative movement between the segments 254, 256 of the segmented bead molding ring 252 and the top spring plate 260 to movement in radial directions (e.g., directions 310 as indicated in FIG. 6B).

A cross-section taken along the 10B—10B line in FIG. 10 is shown in FIG. 10B. The cross-section extends through the middle of a representative guide tee 290 that is attached to the top spring plate 260 by means of the screws 292, with the standoff 291b holding the crossbar 291a above the top spring plate 260 by a suitable amount so that the guide tee 290 will fit inside the guide slot 294 as described hereinabove.

FIG. 11 shows a top view of the bottom spring plate 262, that is designed to be assembled concentrically below the top spring plate 260 as shown in the cross-sectional views of FIGS. 2–5, 7, 8A and 8B. The reference numbers that are applied to elements in the upper left portion of the drawing should be understood to apply similarly to all such elements around the bottom spring plate 262. Guide holes 286 are positioned correspondingly with the threaded mounting holes 284 in the top spring plate 260, and bottom axial spring pockets 277 are positioned correspondingly with the top axial spring pockets 275 in the top spring plate 260. Referring also to the cross-sectional view of FIG. 11A, taken along the 11A—11A line in FIG. 11, the bottom axial spring pocket 277 is seen to open upward in order to contain the lower end of the axial spring 276 (best seen in FIGS. 8A and 8B, and further discussed hereinbelow). The guide hole 286 extends part way through the top of the bottom spring plate 262 and then widens out into a cylindrical cavity 288 that extends to the bottom of the bottom spring plate 262. The guide hole 286 and cavity 288 are designed to accommodate portions of the guide bolt 282 (best seen in FIGS. 8A and 8B, and further discussed hereinbelow).

A radially outer periphery 299 of the bottom spring plate 262 is provided with features 296, 297, and 298a that are designed to interlock with corresponding features of a radially inner periphery 305 of the adapter plate 264, that is assembled concentrically surrounding the bottom spring plate 262 and is described in more detail hereinbelow with reference to FIGS. 12 and 12A. Still referring to FIG. 11, a cross-sectional view is taken along the line 11B—11B and shown in FIG. 11B; and a radial side view is taken along the line 11C—11C and shown in FIG. 11C. A plurality (e.g., three) of preferably regularly spaced flanges 297 are provided on the radially outer periphery 299 of the bottom spring plate 262. As indicated by the hidden (dashed) lines in FIG. 11, and best seen in FIGS. 11B and 11C, a groove 296 is cut into the bottom portion of the radially outer periphery 299 and extends circumferentially all the way around the periphery 299. As best seen in the cross-sectional view of FIG. 11B, the flanges 297 protrude into portions of the groove 296, but always leave a portion of the groove 296 open so that the groove 296 is continuous circumferentially all the way around the periphery 299. The flange 297 shown in the side view of FIG. 11C is interrupted by a key slot 298a that extends vertically (axially) from top to bottom of the radially outer periphery 299 of the bottom spring plate 262.

FIG. 12 shows a top view of the adapter plate 264 that is designed to be assembled concentrically surrounding the bottom spring plate 262, and that also functions as a spacer between the bottom sidewall plate 202b and the base 206 of the mold press 220 as shown in the cross-sectional views of FIGS. 2–5, 7, 8A and 8B. Referring to both FIG. 12 and FIG. 12A, which is a cross-sectional view taken along the line 12A—12A in FIG. 12, a tongue 304 is provided on the radially inner periphery 305 of the adapter plate 264. The tongue 304 extends around the inner periphery 305, but is interrupted by flange gaps 300 that correspond in quantity, size and interval spacing to the flanges 297 of the bottom spring plate 262. A tongue key slot 298b is provided in a suitable location such that when the adapter plate 264 and the bottom spring plate 262 are properly assembled, the bottom spring plate 262 can be rotated until the flange key slot 298a and the tongue key slot 298b are aligned, allowing a key (not shown) to be inserted for locking the plates 262 and 264 together. A registration lip 302 is provided to assure concentricity of the adapter plate 264 and the bottom sidewall plate 202b when they are assembled in the mold press 220. A plurality of threaded holes 306a and/or recessed holes 306b are optionally provided so that screws and/or studs can be used to attach and position the adapter plate 264 relative to the bottom sidewall plate 202b and the base 206 of the mold press 220.

FIGS. 7, 8A, and 8B are detailed "close-up" cross-sectional views of the expandable bead molding ring assembly 250 of the mold 200. FIG. 7 shows the assembly 250 with the segmented bead molding ring 252 in a disengaged and retracted state as in FIGS. 6B and 2, but with the cross-section taken on a different radius line than FIG. 2 in order to show elements associated with the radial springs 272. FIG. 8A shows the assembly 250 with the segmented bead molding ring 252 radially expanded as in FIGS. 6A and 3A, but with the cross-section taken on a different radius line than FIGS. 3A and 7 in order to show elements associated with the axial spring elements 276. FIG. 8B shows the assembly 250 with the already-expanded segmented bead molding ring 252 moved axially outward into position to engage an unmolded bead 112b' (not shown) as in FIG. 3B, but with the cross-section taken on the same line as FIG. 8A.

FIG. 7 is a cross-section taken along the line 9A—9A of FIG. 9, i.e., radially through the center of one of the spring hooks 268 in a typical segment (e.g., first segment 254) of the segmented bead molding ring 252. Although the first segment 254 is shown in the illustration and discussion of FIG. 7, it should be understood that the same elements are present in a similar fashion in the second segments 256. FIGS. 8A and 8B are cross-sections taken along the line 11A—11A of FIG. 11, i.e., radially through the center of a typical axial spring pocket 277 and a typical guide hole/cavity 286/288 below a typical segment (e.g., second segment 256) of the segmented bead molding ring 252.

With reference to FIGS. 5, 6A, 7, 8A and 8B, the expandable bead molding ring assembly 250 can be viewed as an assembly. The bottom lock ring 266 is bolted to the bottom clamp ring 208b and is positioned above the segmented bead molding ring 252, not attached to each other, but interacting as a lock ring cam surface 267 slides against the cam surface 258 of the bead molding ring 252.

By means of the guide tees 290 in the tee guide slots 294, the segments 254 and 256 of the segmented bead molding ring 252 are axially held on top of the top spring plate 260, but the segments 254 and 256 are allowed to slide radially relative to the top spring plate 260. Each spring hook 268 is attached to the bottom of a segment 254, 256 and hooks down through a hook slot 271 into a spring holding hole 274 in the top spring plate 260 where it interacts with a radial spring 272 that thereby exerts radially inward force on the segment 254, 256.

The top spring plate 260 is held concentric and above the bottom spring plate 262 by the guide bolts 282 that guide movement of the top spring plate 260 in an axial-only (vertical) direction as a shank portion 283b of the guide bolt 282 slides in a guide hole 286 of the bottom spring plate 262. The guide bolt 282 is preferably a shoulder bolt having a threaded portion 283a for screwing into the mounting hole 284 of the top spring plate 260; a smooth-sided shoulder or "shank" 283b that slidingly fits in the guide hole 286; and a bolt head 283c. The guide bolt head 283c has clearance to move up and down within the cavity 288 in the bottom spring plate 262 but limits the upward movement of the guide bolt 282, and therefore of the top spring plate 260, when the bolt head 283c stops against the top end 289 of the cavity 288. Axial springs 276 are seated in spring pockets: a top axial spring pocket 275 in the top spring plate 260, and a bottom axial spring pocket 277 in the bottom spring plate 262. The axial springs 276 exert a separating force pushing the top spring plate 260 upward (axially inward).

The bottom spring plate 262 is removably attached concentrically to, and radially within, the adapter plate 264 by means of the tongue 304 of the adapter plate 264 interacting with the groove 296 and flanges 297 of the bottom spring plate 262. When the flanges 297 are aligned with the flange gaps 300 in the tongue 304, the bottom spring plate 262 can be lowered into the center of the adapter plate 264 such that the flanges 297 pass down through the flange gaps 300 to the other side of the tongue 300 and the tongue 304 comes to rest in the groove 296. Then the bottom spring plate 262 can be rotated around its axis of revolution such that the flanges 297 slide around under the tongue 304, thereby trapping the tongue 304 of the adapter plate 264 in the groove 296 between the flanges 297 and the radially outer periphery 299 of the bottom spring plate 262. The bottom spring plate 262 and the adapter plate 264 can be locked together by aligning the optional key slots 298a, 298b, respectively, and then inserting a key (e.g., a roll pin, not illustrated).

The adapter plate 264 has a registration lip 302 for holding the bottom sidewall plate 202b concentrically aligned to it. Pegs or screws (not shown) in holes (e.g., holes 306 in the adapter plate 264) can be used to hold the bottom sidewall plate 202b in position on top of the adapter plate 264. Likewise, pegs or screws (not shown) in holes (e.g., holes 306 in the adapter plate 264) can be used to hold the adapter plate 264, and therefore to hold the entire expandable bead molding ring assembly 250, in proper position on the press base 206.

As indicated in FIG. 7, a mold assembly 280 comprising the segmented bead molding ring 252, the top spring plate 260, the bottom spring plate 262, the adapter plate 264, and the bottom sidewall plate 202b is a single unit that can be easily switched in and out of the mold press 220 for mold maintenance or for mold changeover to adapt to different profiles to be molded on beads of different tire constructions.

The interaction of the elements of the inventive expandable bead molding ring assembly 250 will now be discussed, with particular reference to FIGS. 7, 8A and 8B. A feature of the present invention is that the two-stage movement of the expandable bead molding ring 252 is accomplished using a simple assembly of easily manufactured parts, that are therefore less expensive than the complex mechanisms of the prior art. The two-stage movement from a retracted and disengaged state (FIG. 7), to a radially expanded state (FIG. 8A), to an expanded and engaged state (FIG. 8B), is driven by a simple continuous downward (axially outward) movement of the hub 209 of the mold press 220. A combination of annular elements with springs converts the hub 209 movement to the desired two-stage movement of the segments 254, 256 of the segmented bead molding ring 252. The annular elements can be manufactured with simple machining and hole boring processes.

FIG. 7 shows the segment 254 of the segmented bead molding ring 252 in the radially retracted and disengaged state required for loading and unloading tires 110', 110. The segmented bead molding ring 252 is positioned radially inward of, and also above (axially inward of) the location of a bottom bead 112b', 112 when it rests in the bottom sidewall plate 202b (also see FIG. 2). The radial spring 272 is one of two such springs 272 for the segment 254, one on either side of the guide tee 290, and the pair of springs 272 are compression springs designed to apply (as a pair) sufficient force in a radial direction to push the segmented bead molding ring 252 radially inward to a retracted position as shown in FIGS. 2, 6B, and 7. In FIG. 7, it can be seen that the frustraconically-shaped bottom lock ring 266 is in a raised position that allows the segmented bead molding ring 252 to retract, i.e., move radially inward toward the center post 204. As noted hereinabove, the guide tees 290 restrict the segments 254, 256 of the segmented bead molding ring 252 to only radial movement relative to the top spring plate 260. It can be seen that the spring hooks 268 can be used to limit the extent of radial movement when the spring hook 268 stops against an end of the hook slot 271. Radially inward movement of the segments 254, 256 is also limited by the position of the bottom lock ring 266.

FIG. 8A shows the segmented bead molding ring 252 after the first stage of movement to the radially expanded state, i.e., as shown in FIGS. 3A and 6A. The downward movement (axially outward, in the direction indicated by arrow 320) that the mold press 220 imparts to the hub 209 and the bottom clamp ring 208b has moved the bottom lock ring 266 downward (direction 320), exerting a downward first force 420a. Because the bottom lock ring 266 exerts the first force 420a on the segmented bead molding ring 252 by means of the cam surface 267 that is at an angle θ, the first force 420a is divided into two component forces exerted on the ring 252: a horizontal (radial) first force component 410a, and a vertical (axial) first force component 415a. The first force 420a must be sufficient to produce a radial first force component 410a sufficient to overcome the compressive resistance of the radial springs 272 so that the bottom lock ring 266 wedges the first segment 254 radially outward in the direction indicated by arrow 310, the only direction of movement allowed by the radially aligned guide tees 290. As noted hereinabove with reference to FIGS. 6A and 6B, the second segments 256 are in turn wedged radially outward by the first segments 254. It can be seen from FIGS. 6A and 6B that the bottom lock ring 266 will not contact the cam surface 258 of the second segments 256 until the segmented bead molding ring 252 is fully expanded as in FIG. 6A. The bottom lock ring 266 is preferably a ring with a frustraconical radially outer cam surface 267 (best seen in FIG. 7) that has a cam angle θ that matches the cam angle θ of the complementary cam surface 258 (see FIG. 9A) of the segments 254, 256 of the segmented bead molding ring 252. It is within the scope of the present invention to construct alternate embodiments wherein the frustraconical cam surface 267 of the bottom lock ring 266 is replaced by other devices that interact with the cam surfaces 258 of at least the first segments 254 to wedge the first segments outward (direction 310) as the hub 209 is moved downward (direction 320). For example, cam rollers (not shown) could be attached to the hub 209 so that they roll against the cam surfaces 258 of at least the first segments 254. The first force 420a must also be sufficient to produce an axial first force component 415a sufficient to overcome frictional resistance so that the bottom lock ring 266 slides downward (320) as it wedges the segmented bead molding ring 252 radially outward (310). The cam angle θ is selected to appropriately balance the first force components, and is suitably less than 45° (e.g., 30°) in order to reduce frictional resistance and increase radial forces. In order to assure that the first stage movement of the segmented bead molding ring 252 is radial and not axial, the axial springs 276 are designed such that their compression resistance is greater than the axial first force component 415a while the bottom lock ring 266 is causing the first stage radial movement of the segmented bead molding ring 252.

The radial expansion (radially outward direction 310) of the segmented bead molding ring 252 is halted when the outer stop surface 278 of the segmented bead molding ring 252 stops against a radially inner surface 242 of the bottom sidewall plate 202b. Further downward movement (axially outward direction 320) of the hub 209, and therefore of the bottom lock ring 266, will cause compression of the axial springs 276, provided that a downward second force 420b exerted by the mold press 220 on the bottom lock ring 266 is sufficient. Again due to the cam angle θ, the second force 420b is divided into two component forces exerted on the ring 252: a horizontal (radial) second force component 410b, and a vertical (axial) second force component 415b. The radial second force component 410b presses the outer stop surface 278 against the radially inner surface 242 producing friction that resists downward sliding of the segmented bead molding ring 252. In order to cause the desired second stage axial movement, the axial second force component 415b must be sufficient to overcome the sum of the compression resistance of the axial springs 276 and the frictional resistance between the surfaces 278 and 242.

FIG. 8B shows the segmented bead molding ring 252 after the second stage of movement to the final engaged state for bead molding, also shown in FIGS. 3B, 4, and 5. Because radial movement 310 of the segments 254, 256 is halted as they are stopped against the bottom sidewall plate 202b, continued downward movement 320 of the bottom lock ring 266 requires application of the second force 420b, and the second force 420b is sufficient to cause the axial springs 276 to compress, thereby allowing the segments 254, 256 to be pushed downward (axially outward, direction 315) along with the top spring plate 260. The segmented bead molding ring 252, continually forced radially outward against the bottom sidewall plate 202b, moves downward with the outer stop surface 278 sliding against the radially inner surface 242 until downward movement is halted when the lower stop surface of segments 254, 256 stops against a top stop surface 203 of the bottom sidewall plate 202b.

Thus has been described an inventive tire mold with an inventive expandable bead molding ring and an inventive method for molding tires using the inventive mold. While incorporating a desirable two-stage engagement movement, the expandable bead molding ring 252 is simplified over prior art expandable rings, such that the two-stage movement is driven by a simple wedging action caused by a single ring-shaped cam 266. The elements of the bead molding ring assembly 250 are combined with the sidewall molding plate 202b to form a mold assembly 280 that is easily maintained and easily switched in a mold press 220 for mold changeover to adapt to different profiles to be molded on beads of different tire constructions.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for providing a two-stage movement for engagement of an expandable bead molding ring with a sidewall molding plate to form a bead molding pocket in a tire mold within a mold press; wherein a first stage of movement comprises radial expansion of the bead molding ring to form a circumferentially continuous outward-facing bead molding surface that is positioned axially inward of the sidewall molding plate; and a second stage of movement comprises pressing the bead molding ring axially outward to engage the bead molding surface with the sidewall molding plate, thereby forming a bead molding pocket for molding a green tire bead; the method comprising the steps of:

using axial movement of the mold press to cause both the first stage and the second stage of movement;

resisting the first stage of movement with a first set of springs;

providing first stopping surfaces for halting the first stage of movement when the circumferentially continuous outward-facing bead molding surface is formed;

resisting the second stage of movement with a second set of springs;

providing the second set of springs with spring resistance sufficient to prevent axial movement of the bead molding ring until after the first stage of movement is halted by the first stopping surfaces; and providing second stopping surfaces for halting the second stage of movement when the bead molding pocket has been formed.

2. A method according to claim 1, further comprising the step of:
   providing a cam surface on the bead molding ring for dividing an axial force from the mold press into radial force components and axial force components for causing corresponding radial movements and axial movements of the bead molding ring.

3. A method according to claim 1, further comprising the steps of:
   using the second set of springs to cause axial disengagement of the bead molding surface from the sidewall molding plate when axial movement of the mold press removes force from the second set of springs; and
   using the first set of springs to cause radial retraction of the bead molding ring when axial movement of the mold press removes force from the first set of springs.

4. An expandable bead molding ring assembly for a tire mold in a mold press that is configured to mold a green tire comprising a tread, two beads, and two sidewalls extending between the beads and the tread; the expandable bead molding ring assembly characterized by:
   a first annulus that is a segmented bead molding ring, comprising a plurality of segments that radially expand to form a circumferentially continuous radially outward-facing surface for molding one of the beads, and a radially inner frustraconical cam surface for dividing axially-directed forces into a radial force component and an axial force component;
   a second annulus, concentric and axially adjacent to the first annulus, that is a top spring plate, comprising radially-oriented radial springs that are attached to all of the plurality of segments for controlling radial movement of the plurality of segments; and
   a third annulus, concentric and axially adjacent to the second annulus, that is a bottom spring plate, comprising axially-oriented axial springs acting between the second annulus and the third annulus for controlling axial movement of the plurality of segments.

5. An expandable bead molding ring assembly according to claim 4, characterized by:
   a fourth annulus having a frustraconical radially outer cam surface that is complementary to the radially inner cam surface of the first annulus, wherein:
      the fourth annulus is attached to the mold press such that the mold press will impart axially directed movement and axially directed forces to the fourth annulus; and
      the radially outer cam surface of the fourth annulus is positioned concentrically within the first annulus such that the radially outer cam surface of the fourth annulus bears on the radially inner cam surface of the first annulus for applying the axially directed forces from the mold press to the cam surface of the first annulus.

6. An expandable bead molding ring assembly according to claim 4, characterized by:
   a plurality of tee-shaped guide slots in the first annulus opening toward the adjacent second annulus, wherein a wider crossbar portion of the tee-shape has radially aligned slot guide surfaces; and
   a plurality of guide tees protruding from the second annulus toward the adjacent first annulus, shaped and dimensioned to fit inside the tee-shaped guide slots, the guide tees comprising a crossbar having tee guide surfaces complementary to the slot guide surfaces for holding the segments of the first annulus at a fixed axial distance from the second annulus while also allowing the segments to slide radially in and out.

7. An expandable bead molding ring assembly according to claim 4, characterized by:
   a plurality of guide bolts that slidingly pass through axially-aligned guide holes in the third annulus and are attached to the second annulus, for holding the second and third annuluses concentric and axially adjacent while guiding movement of the second annulus in an axial-only direction.

8. An expandable bead molding ring assembly according to claim 7, characterized by:
   a bolt head on each guide bolt; and
   a cavity that widens each guide hole in the third annulus, such that the bolt head has clearance to move axially within the cavity but limits the axially inward movement of the second annulus that is attached to the guide bolt, when the bolt head stops against the end of the cavity.

9. An expandable bead molding ring assembly according to claim 4, characterized by:
   a plurality of spring hooks attached to the segments of the first annulus such that each spring hook extends to a one of the radial springs of the second annulus for interaction whereby the radial springs exert radially-directed force on the segments.

10. An expandable bead molding ring assembly according to claim 9, characterized in that:
    the radial springs of the second annulus are held in radially-aligned spring holding holes that have hook slots for providing an opening along a side of each spring holding hole such that a spring hook hooks through the hook slot into the spring holding hole to interact with the radial spring; and
    the radial springs exert a radially-inward directed force on the segments of the first annulus.

11. An expandable bead molding ring assembly according to claim 10, characterized in that:
    at least one spring hook is used to limit the extent of radial movement of the segments of the first annulus when the spring hook stops against an end of the hook slot.

12. An expandable bead molding ring assembly according to claim 4, characterized in that:
    each axially-oriented axial spring has one end seated in a first axial spring pocket in the second annulus, and has an other end seated in a second axial spring pocket in the third annulus, such that the axial springs exert a separating force between the second annulus and the third annulus.

13. An expandable bead molding ring assembly according to claim 4, characterized in that:
    half of the plurality of segments of the first annulus are first segments that are complementary to, and circumferentially alternated with second segments;
    the first segments are wedge shaped, having circumferentially lateral faces that converge towards a radially outward-facing bead molding surface of the bead molding ring, the first segment lateral faces being planar and oriented in an axial direction; and
    the second segments have lateral faces that are complementary to the first segment lateral faces.

14. An expandable bead molding ring assembly according to claim 4, characterized in that:
    the first annulus, second annulus, and third annulus are concentric to, and radially within an annular sidewall molding plate;

a fifth annulus that is an adapter plate is concentric, adjacent, and axially outward of the sidewall molding plate; and the third annulus is attached to the fifth annulus such that a tongue protruding from a radially inner periphery of the fifth annulus is trapped in a groove between flanges and a radially outer periphery of the third annulus.

15. A mold for a green tire comprising a tread, two beads each having a radially inward-facing bead base extending from an axially outer heel to an axially inner toe, and two sidewalls extending between the beads and the tread; the mold comprising:

first and second sidewall plates for molding, respectively, an outer surface of each of the sidewalls plus an axially outer portion of each of the beads approximately in to the heel;

first and second bead molding rings for molding at least the bead bases of the two beads; and an inflatable vulcanizing membrane for molding the inside surfaces of the tire;

wherein the mold is characterized by:

at least one segmented bead molding ring that is annular and comprises a plurality of segments that radially expand to form a circumferentially continuous radially outward-facing surface for molding one of the beads in cooperation with one of the sidewall plates and the vulcanizing membrane; and a radially inner frustraconical cam surface for dividing axially-directed forces into a radial force component and an axial force component;

an annular top spring plate, concentric and axially adjacent to the segmented bead molding ring, comprising radially-oriented radial springs that are attached to all of the plurality of segments for controlling radial movement of the plurality of segments;

an annular bottom spring plate, concentric and axially adjacent to the top spring plate, comprising axially-oriented axial springs acting between the top spring plate and the bottom spring plate for controlling axial movement of the plurality of segments; and an annular lock ring having a frustraconical radially outer cam surface that is complementary to the radially inner cam surface of the segmented bead molding ring, wherein:

the lock ring is attached to the mold press such that the mold press will impart axially directed movement and axially directed forces to the lock ring; and the radially outer cam surface of the lock ring is positioned concentrically radially within the segmented bead molding ring such that the radially outer cam surface of the lock ring bears on the radially inner cam surface of the segmented bead molding ring for applying the axially directed forces from the mold press to the cam surface of the segmented bead molding ring.

16. A mold according to claim 15, characterized by:

a plurality of tee-shaped guide slots in the segmented bead molding ring opening toward the adjacent top spring plate, wherein a wider crossbar portion of the tee-shape has radially aligned slot guide surfaces; and a plurality of guide tees protruding from the top spring plate toward the adjacent segmented bead molding ring, shaped and dimensioned to fit inside the tee-shaped guide slots, the guide tees comprising a crossbar having tee guide surfaces complementary to the slot guide surfaces for holding the segments of the segmented bead molding ring at a fixed axial distance from the top spring plate while also allowing the segments to slide radially in and out.

17. A mold according to claim 15, characterized by:

a plurality of guide bolts that slidingly pass through axially-aligned guide holes in the bottom spring plate and are attached to the top spring plate, for holding the top spring plate and the bottom spring plate concentric and axially adjacent while guiding movement of the top spring plate in an axial-only direction.

18. A mold according to claim 15, characterized by:

a two-stage movement for engagement of the segmented bead molding ring with the tire bead, wherein a first stage of movement comprises radial expansion of the segmented bead molding ring to form the circumferentially continuous outward-facing bead molding surface that is positioned axially inward of the tire bead; and a second stage of movement comprises pressing the segmented bead molding ring axially outward to engage the bead molding surface with the green tire bead and to work with one of the sidewall plates to form a bead molding pocket;

first stopping surfaces for halting the first stage of movement when the circumferentially continuous outward-facing bead molding surface is formed;

spring resistance in the axial springs sufficient to prevent axial movement of the bead molding ring until after the first stage of movement is halted by the first stopping surfaces; and second stopping surfaces for halting the second stage of movement when the bead molding pocket has been formed.

19. A mold according to claim 15, characterized by:

a mold assembly for switching in and out of the mold press as a single unit comprising:

the segmented bead molding ring;

the top spring plate that is concentric and axially adjacent to, and assembled axially outward of, the segmented bead molding ring;

the bottom spring plate that is concentric and axially adjacent to, and assembled axially outward of the top spring plate;

an annular adapter plate that is concentric and radially adjacent to, and assembled radially outward of, the bottom spring plate; and one of the sidewall plates that is concentric and axially adjacent to, and assembled axially inward of the adapter plate.

20. A mold according to claim 19, characterized in that:

the adapter plate is removably attached to the bottom spring plate by means of a tongue protruding from a radially inner periphery of the adapter plate to be trapped in a groove between flanges and a radially outer periphery of the bottom spring plate; and the adapter plate has an annular registration lip protruding axially toward the adjacent one of the sidewall plates for holding the one of the sidewall plates concentrically aligned to the adapter plate.

* * * * *